(12) United States Patent
Hagenbuch

(10) Patent No.: US 7,950,685 B2
(45) Date of Patent: May 31, 2011

(54) METHOD AND APPARATUS FOR TRANSITIONING A HEAVY EQUIPMENT HAULING REAR LOADING TRAILER BETWEEN TRANSPORT AND LOADING POSITIONS

(76) Inventor: LeRoy G. Hagenbuch, Peoria Heights, IL (US)

( * ) Notice: Subject to any disclaimer, the term of this patent is extended or adjusted under 35 U.S.C. 154(b) by 206 days.

(21) Appl. No.: 12/259,244

(22) Filed: Oct. 27, 2008

(65) Prior Publication Data

US 2009/0108562 A1   Apr. 30, 2009

Related U.S. Application Data

(60) Provisional application No. 60/983,082, filed on Oct. 26, 2007, provisional application No. 61/098,716, filed on Sep. 19, 2008.

(51) Int. Cl.
*B62D 53/06* (2006.01)
*B60P 1/00* (2006.01)

(52) U.S. Cl. ............... 280/423.1; 414/476; 414/482; 414/484

(58) Field of Classification Search ........... 280/423.1; 414/474, 476, 481, 482, 483, 484, 485
See application file for complete search history.

(56) References Cited

U.S. PATENT DOCUMENTS

| | | | | |
|---|---|---|---|---|
| 2,861,811 | A | * | 11/1958 | Lassen ............... 280/43.11 |
| 3,000,523 | A | * | 9/1961 | Nicolas ............... 414/476 |
| 3,215,296 | A | * | 11/1965 | Preston ............... 414/476 |
| 3,346,131 | A | * | 10/1967 | Lundell ............... 414/476 |
| 3,362,553 | A | | 1/1968 | Weinmann |
| 3,811,697 | A | | 5/1974 | Armstrong |
| 3,931,934 | A | | 1/1976 | Smith |
| 4,077,643 | A | | 3/1978 | Bates |
| 4,324,077 | A | | 4/1982 | Woolslayer |
| 4,372,572 | A | | 2/1983 | Verschage |
| 4,375,892 | A | | 3/1983 | Jenkins et al. |
| 5,435,586 | A | | 7/1995 | Smith |
| 5,944,471 | A | | 8/1999 | Smith et al. |
| 6,071,068 | A | | 6/2000 | Smith et al. |
| 6,113,338 | A | | 9/2000 | Smith |
| 6,419,418 | B1 | | 7/2002 | Smith |
| 6,729,828 | B2 | | 5/2004 | Bosich |
| 7,036,640 | B2 | | 5/2006 | Spielman |
| 7,287,947 | B2 | | 10/2007 | Smith |
| 2003/0189329 | A1 | | 10/2003 | Smith |
| 2006/0125207 | A1 | | 6/2006 | Smith |

(Continued)

OTHER PUBLICATIONS

"International Mining", Informed and in-depth editorial on the world mining industry, Mar. 2009 (14 pages total).*

(Continued)

*Primary Examiner* — Paul N Dickson
*Assistant Examiner* — Marc A Scharich
(74) *Attorney, Agent, or Firm* — Leydig, Voit & Mayer, Ltd

(57) ABSTRACT

A rear loading lowboy trailer is described having a pair of rear wheel assemblies mounted to a chassis of the trailer for movement between transport and loading positions such that the wheel assemblies are aligned across a back of the chassis when they are in the transport position and raised and positioned outwardly when the chassis is in the loading position. A linkage mechanism moves each of the wheel assemblies in both horizontal and vertical directions so as to move each of the wheel assemblies between the transport and loading positions. Each linkage mechanism automatically fastens the wheel assembly to the chassis of the trailer when the wheel assembly is moved to its transport position.

25 Claims, 44 Drawing Sheets

U.S. PATENT DOCUMENTS

2007/0257551 A1    11/2007    Crawford

OTHER PUBLICATIONS

"SW300 Swing Wheel Low Loader", LoadQuip, retrieved from http://www.loadquip.com.au/index.php?ref=MTY2NA== on Sep. 7, 2009 (4 pages).
Heavy Equipment Low Loader , Loadquip, retrieved from http://www.loadquip.com.au/index.php?ref=MTY2NA== on Sep. 7, 2009 (2 pages).
"Aggregates and Mining Today", Online Equipment & Industry News, retrieved from http://aggregatesandmining today.com/open-pit-mine-production-to-improve-as-larger-to on Nov. 19, 2009 (2 pages).
TowHaul, Lowboys, surface equipment for TowHaul Lowboys retrieved on Aug. 18, 2008 from http://towhal.com/lowboys, Model page modified May 15, 2008 (2 pages).
TowHaul, Lowboy, TowHaul Low Profile Modular Lowboy Trailer (patent pending) retrieved from http://towhal.com on Aug. 18, 2008 (4 pages).
TowHaul, Classic Lowboys "TowHaul classic Lowboy Trailer" (Patented), retrieved from http://towhaul.com on Aug. 18, 2008 (1 page).
TowHaul, Brake Cooling, "TowHaul Brake Cooling System" (patented), retrieved from http:///towhaul.com/brake_cooling.htm on Aug. 18, 2008 (2 pages).
TowHaul, Brake Release "TowHaul Brake Release System" (patent pending), retrieved from http://towhaul.com/brake_release.htm on Aug. 18, 2008 (1 page).
TowHaul, Loading, "Loading Sequence on a TowHaul Low Profile Modular Lowboy Trailer", retrieved from http://towhaul.com/loading.htm on Aug. 18, 2008 (4 pages).
TowHaul, Hook Up, "Hook-Up Ease", retrieved from http://towhaul.com/hook_up.htm on Aug. 18, 2008 (3 pages).
TowHaul, Turn Radius, "The Turn Radius of a Towhaul Lowboy Trailer", retrieved from http://towhaul.com/turn_radius.htm on Aug. 18, 2008 (1 page).
TowHaul, Really Large Lowboys, "400 and 550 Ton Capacity Lowboys at Work", retrieved http://towhaul.com/large_lowboys.htm on Aug. 18, 2008 (5 pages).
TowHaul, GlleryLB, "225 Ton Capacity Low Profile Modular TowHaul Lowboy in the USA" (patent pending), retrieved from http://towhaul.com/gallerylb.htm on Aug. 18, 2008 (5 pages).
TowHaul, Cost Saving, "Proven Cost Saving", retrieved from http://towhaul.com/cost_savings.htm on Aug. 18, 2008 (1 page).
TowHaul, Towing, "Towing Package", retrieved from http://towhaul.com/towing.htm on Aug. 18, 2008 (3 pages).
TowHaul, Towing, "Towing Disabled Haul trucks with the TowHaul Gooseneck", retrieved from http://towhaul.com/towing_package.htm on Aug. 18, 2008 (2 pages).
TowHaul "A 275 Ton Capacity TowHaul Gooseneck Towing a Cat 797" retrieved from http://towhaul.com/gallerygn.htm on Aug. 18, 2008 (2 pages).
TowHaul, Company, "An Introduction to the TowHaul Corporation and our Products..", retrieved from http://towhaul.com/company.htm on Aug. 18, 2008 (2 pages).
TowHaul, Company, "Decrease Cost and Increase Your Mobility", retrieved from http://towhaul.com/decrease_costs.htm on Aug. 18, 2008 (1 pages).
TowHaul, Company, "Engineering Design", retrieved from http://towhaul.com/engineering.htm on Aug. 18, 2008 (2 pages).
TowHaul, Contacts, "Global Contacts", retrieved from http://towhaul.com/contacts.htm on Aug. 18, 2008 (5 pages).
TowHaul, Exporter of the Year, "2004 SBA Small Business Exporter of the Year", (Jun. 14, 2002); retrieved from http://www.towhaul.com/exporter_of_the_year.htm on Jun. 9, 2008 (1 page).
TowHaul, Press Release, Press Release—Oct. 4, 2006 retrieved from http//towhaul.com/press_release.htm on Aug. 18, 2008 (2 pages).
TowHaul, "Break Release System", vol. 3, No. 4, Jun. 2006 (2 pages).
TowHaul, Smith Equipment USA: "TowHaul Low Profile Modular Trailer", vol. 3, No. 3, Oct. 2004 (2 pages).
The TowHaul Press, "We're Growing with the Equipment We Haul", vol. 1, No. 1, Apr./May 2000 (3 pages).
The TowHaul Press, "TowHaul on Haul Road Conditioning", vol. 2, No. 1, Mar. 2002 (3 pages).
The TowHaul Press, "Komatsu 830E Prime Mover Towering a Caterpillar 797", vol. 2, No. 3, Apr. 2004 (2 pages).
The TowHaul Press, "Introducing the TowHaul Water Tank Carrier", vol. 2, No. 2, Sep. 2003, (3 pages).
The TowHaul Press, "Custom Manufactured to Suit Your Needs", vol. 2, No. 2, Oct. 2002, (3 pages).
The TowHaul Press, "Towing Disabled Haul Trucks", vol. 1, No. 5, Oct. 2001 (3 pages).
TowHaul by Smith, Decrease Your Costs/Increase Your Mobility, this material pre-dates the filing of this application Oct. 27, 2008.
SBA News, U.S. Small Business Administration, "TowHaul Corporation , dba Smtih Equipment of Belgrade Name SBA's National Small Business Exporter of the Year", Release Date: Mar. 25, 2004 (2 pages).
Elephant Extravaganza, Sauer-Danfoss Products, the circuit , *Sauer Danfoss News Magazine*, Issue No. 10, Jan. 2008 (12 pages total).
Web pages from Hercules-Equipment retrieved from http"//www.hercules-equipment.com on Dec. 9, 2008 and Dec. 16, 2008, Model TR2001, 200 Tons Lowbed Trailer with a 35' Long by 20' Wide Workable Deck, (3 pages total).
Mega Equipment Trailers Brochure , MEGA Corp., 2008 (4 pages total).
Lampson, Platform Trailers Brochure (4 pages total) this material pre-dates the filing of this application of Oct. 27, 2008.
Aspen Custom Trailers Brochure, "Where Mission Impossible Becomes Mission Accomplished" (4 pages total) this material pre-dates the filing of this application of Oct. 27, 2008.
Lone Star Transportation Brochure, Come Ride with the Brand—this material pre-dates the filing of this application of Oct. 27, 2008.
Bozeman Montana, President's Archive (Jun. 1, 2004), retrieved from http://www.bozemanchamber.com/chamber_info/president_archive/details/?Column_ID=10 on Jun. 9, 2008 (1 page).
RAX, The Bosich Rear-Axile-Expanding Low Loader Brochure, The revolutionary way to load heavy equipment and move it around, Bosich (1955) PTY LTD. (6 pages total)—this material pre-dates the filing of this application of Oct. 27, 2008.
Seven (7) Photos of prior art Bosich Trailer, including (1) Empty trailer in transport mode; (2) Operator's platform; tires rotated to side of trailer; (3) Control panel: Rams/Swings/clamp/Suspension; (4) Trailer in loaded position with truck loaded on trailer; (5) Tires swung to the side; lading ramps up; (6) Truck loaded on trailer; trailer in transport position; and (7) O&K 120C Hydraulic excavator loaded on trailer and being transported, photos taken no later then Apr. 3, 2008.

* cited by examiner

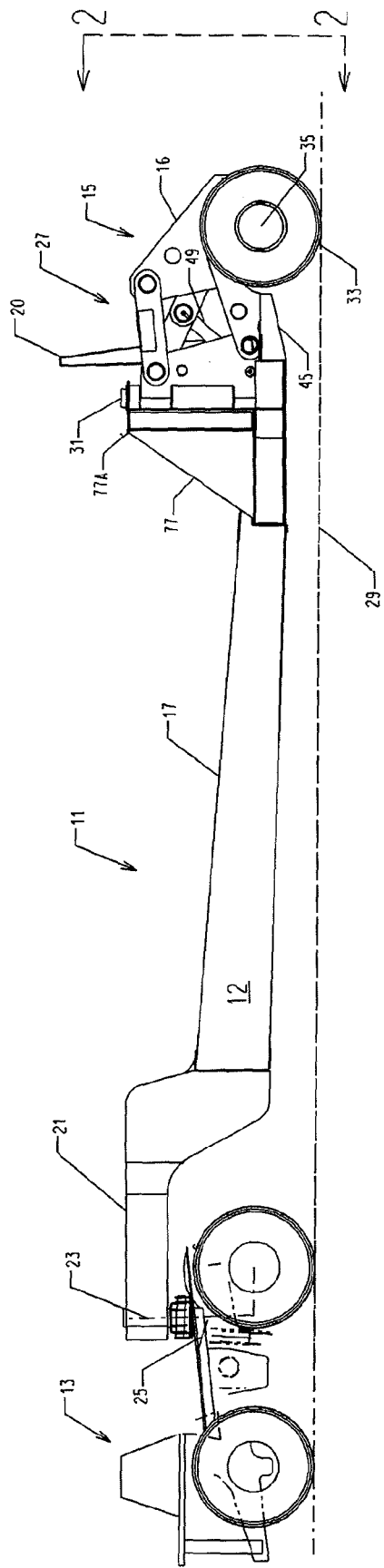

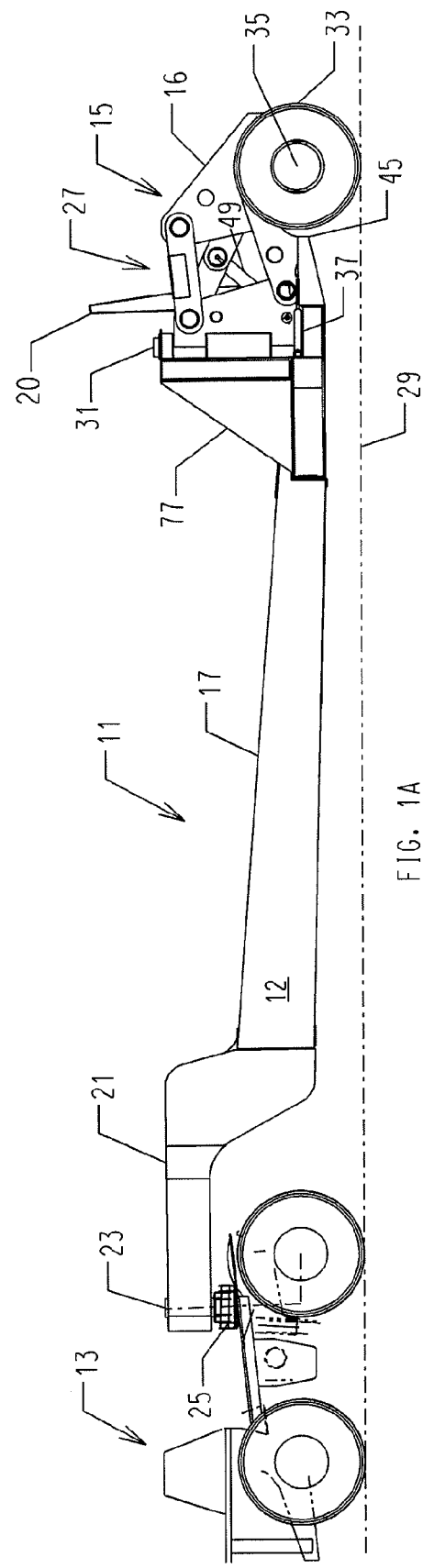

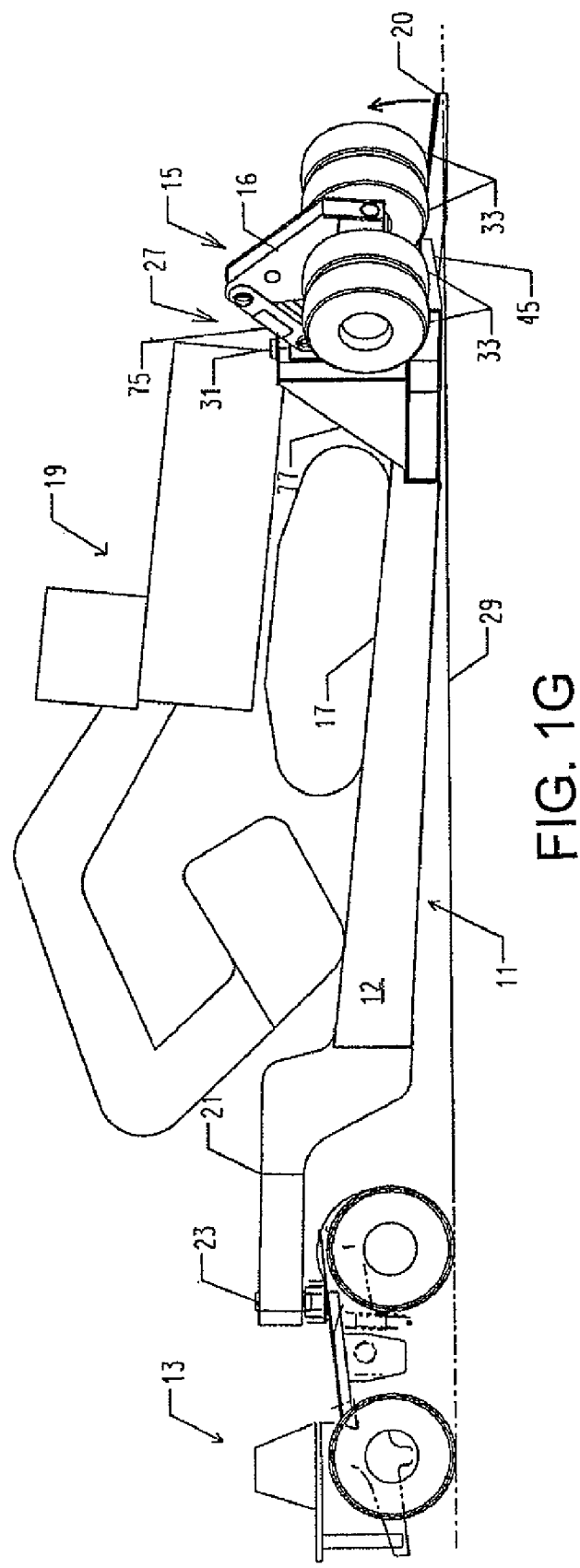

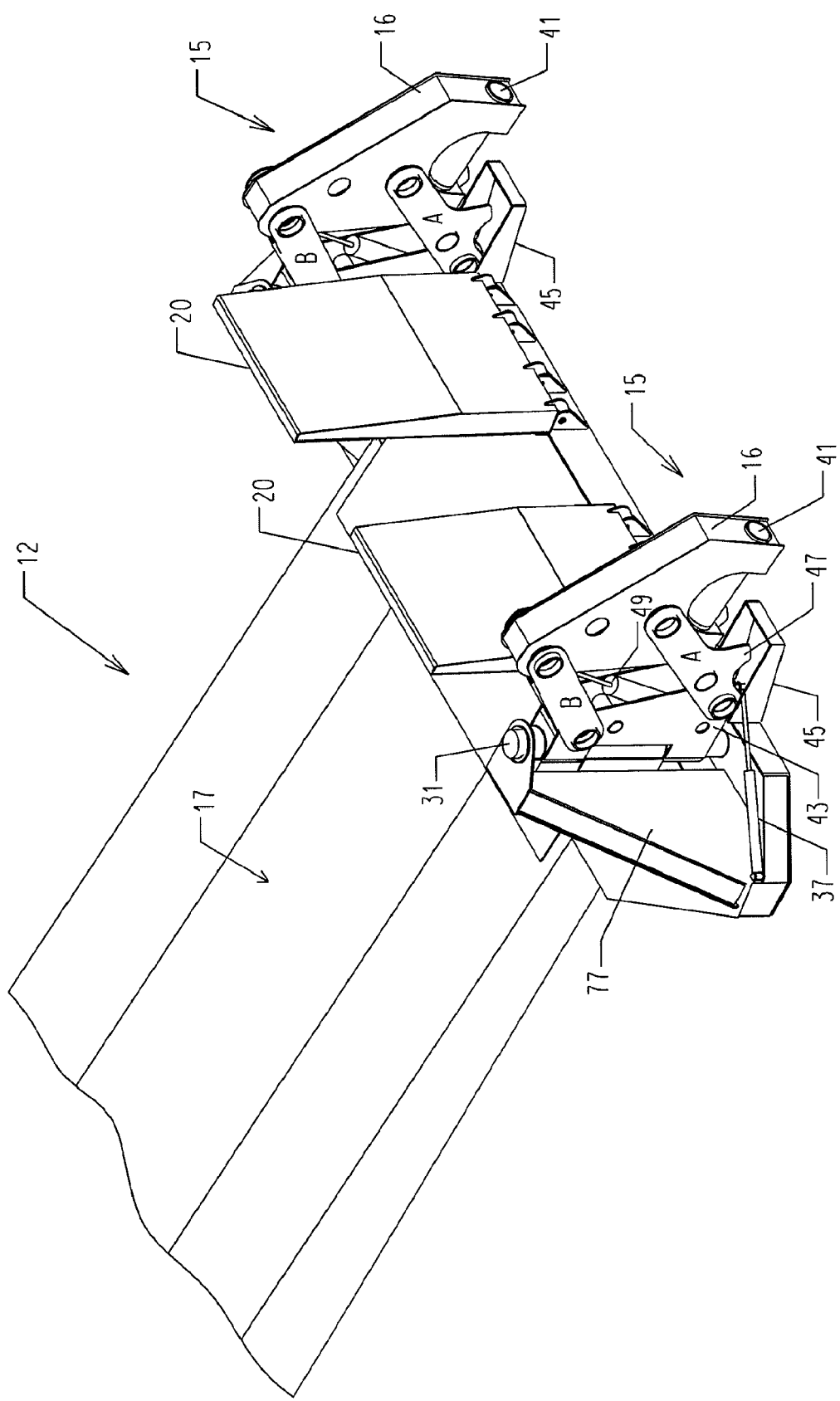

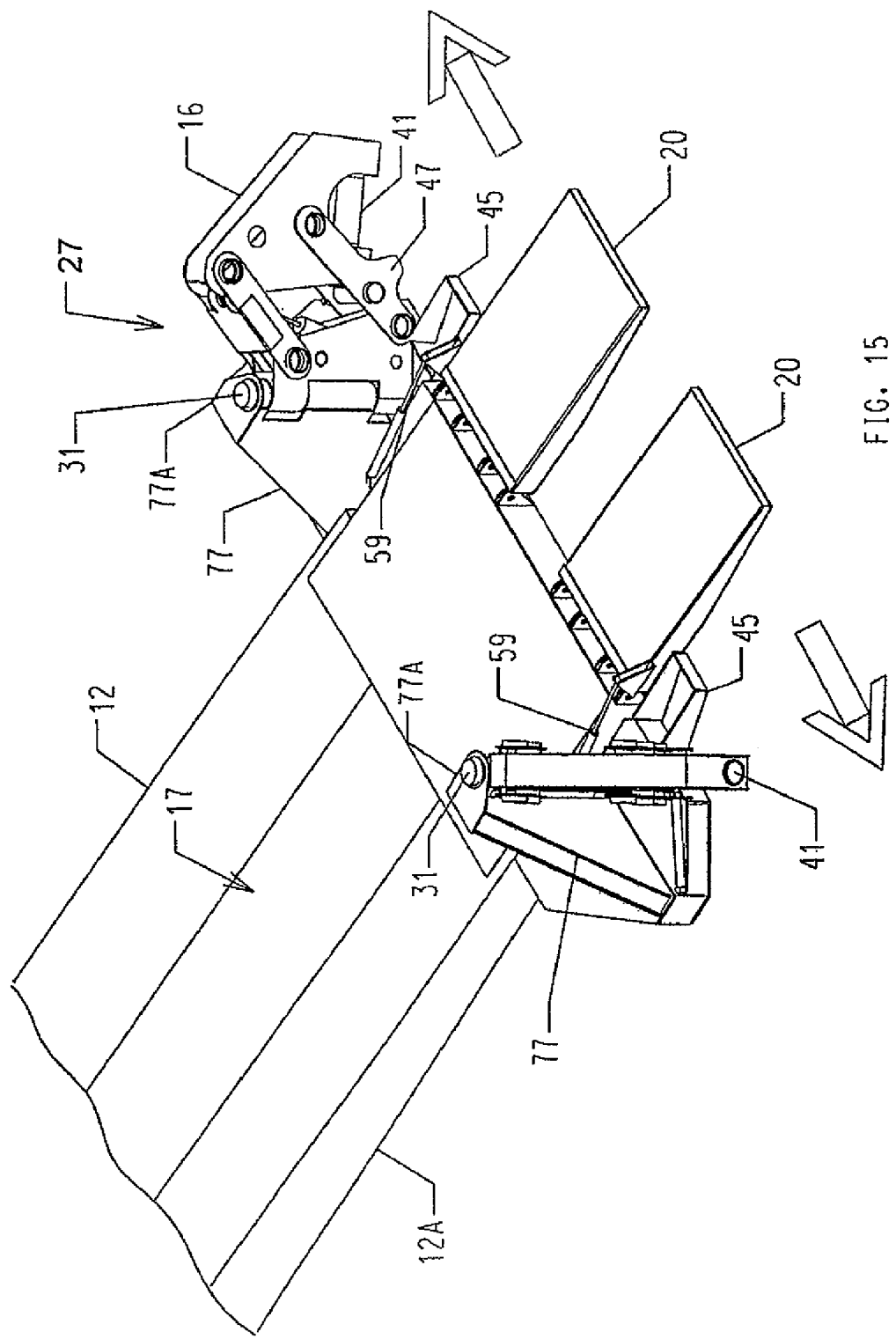

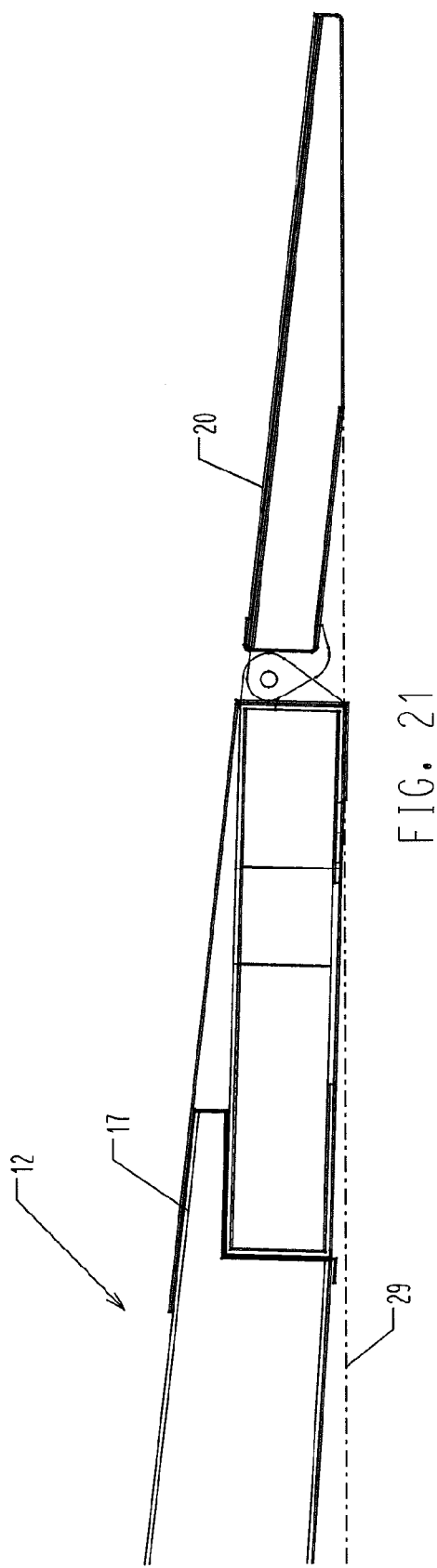

METHOD AND APPARATUS FOR TRANSITIONING A HEAVY EQUIPMENT HAULING REAR LOADING TRAILER BETWEEN TRANSPORT AND LOADING POSITIONS

CROSS-REFERENCE TO RELATED APPLICATIONS

This patent application claims the benefit of U.S. Provisional Patent Application Nos. 60/983,082, filed Oct. 26, 2007, and 61/098,716, filed Sep. 19, 2008, each of which is incorporated by reference in its entirety and for everything it teaches.

FIELD OF THE INVENTION

The present invention is directed to a rear loading heavy equipment hauling lowboy trailer and a method of using it. In particular, the invention concerns a trailer for transporting heavy loads such as earth-moving machinery and apparatus and methods for loading and unloading the heavy loads to and from the lowboy trailer.

BACKGROUND OF THE INVENTION

Lowboy trailers are often used to transport heavy machinery from one work site to another. These trailers are typically flatbed carriers with a gooseneck connection to a tractor. This type of trailer is commonly called a "lowboy" because the trailer is characterized by a low elevation of the trailer's deck. The low deck elevation enables both heavy and dimensionally oversized loads to be moved onto the trailer by way of a ramp that is at a relatively low incline because of the low elevation of the trailer deck.

However, even with the low elevation of the trailer deck that gives the trailer a characteristic look and its "lowboy" name, loading equipment onto the trailer is difficult if the equipment is driven up the ramp and up over onto the lowboy trailer, which is typically done when the equipment is self-powered. Examples of self-powered machines are any type of earth moving equipment that is mounted to a chassis with tracks or tires driven by an engine.

Lowboy trailers are typically designed to be loaded from one of the front, rear or sides of the trailer. In each of these cases, however, loading heavy earth moving equipment onto the trailer by driving the equipment up a ramp and onto the deck of the trailer creates an extreme force on both the edge of the trailer and the undercarriage of the earth moving equipment as the entire weight of the earth moving equipment transfers to the trailer at the trailer's edge during the equipment's movement up the ramp and over onto the trailer.

One solution to this problem of severe forces on the edges of the trailer is to lower the trailer to the ground during loading in order to stabilize the trailer while it experiences the large and dynamic forces caused by the equipment moving up a ramp and on to the deck of the trailer. Lowboys are known that are lowered at either their front or rear ends for equipment loading.

An example of a lowboy whose front is lowered is shown in U.S. Pat. No. 7,287,947 to Smith. For front-loaded lowboys, the tractor hitching apparatus or gooseneck is unhooked from the trailer chassis proper for loading and then rehooked up to the trailer chassis proper after the trailer chassis is loaded, making the loading process both cumbersome and time consuming. After the machinery to be hauled is loaded, the trailer hitch or gooseneck must be reattached to the front of the trailer chassis by the tractor and then the front of the trailer chassis must be hydro-mechanically elevated for transport.

Lowboys designed to load from the rear of the trailer do not require unhooking of the hitching apparatus. Examples of rear-loading lowboys are shown in U.S. Pat. No. 3,811,697 to Armstrong, U.S. Pat. No. 4,077,643 to Bates and U.S. Pat. No. 6,113,338 to Smith. These examples employ various apparatus and techniques for lowering the elevation of the rear of the trailer so that it is supported by the ground. The remaining difference in elevation between the ground and the deck of the trailer is bridged up and over by a ramp. In these examples, the trailer wheel assemblies are supported by axles extending from the sides of the trailer. Linkages and hydraulics move the wheel assemblies up and down relative to the trailer chassis in order to lower and raise the rear of the trailer.

However, often the weight of the machinery loaded on to the trailer is too much for a conventional wheel and axle assembly where the wheels and axles of the assembly extend cantilevered from the sides of the trailer for supporting the wheels and tires as in the Armstrong, Bates and Smith patents. The weight of the load carried by the trailer creates large moment arm torques on the cantilevered axles because of the outboard positions of the wheels and tires. The stresses on the axle created by these large moment arms makes it difficult for such trailers to carry the heaviest of loads such as the largest earth moving equipment.

To address the problem of the large moment arm torque and associated stresses on the axle, lowboy trailers are known that have wheel and tire assemblies at the rear of the trailer such that the axle or axles do not extend laterally beyond the sides of the trailer. This arrangement can reduce the moment arm about the axle. But the location of the axle and wheel assemblies obstructs access to the rear trailer edge for loading.

For this type of lowboy trailer, mechanical assemblies are known that enable the rear axle and wheel assemblies to be moved laterally out of the way of the rear of the trailer for loading and unloading. Hydraulic systems are employed to move the rear axle and wheel assemblies to positions outboard of the rear of the trailer and to also lower the trailer rear elevation so that it is as close to the ground as possible. Often though a ramp is still used to bridge the remaining elevation between the ground and the trailer deck.

An example of such a trailer is illustrated in U.S. Pat. No. 6,729,828 to Bosich, which describes a lowboy trailer with a chassis whose rear wheels are mounted on two axles attached to the chassis by way of pivoting support arms. In their transport position, the rear wheels are positioned at the rear of the chassis. The support arms pivot about two axes so that the wheels are raised vertically and rotated outwardly. Raising the rear wheels lowers the rear of the trailer chassis to the ground, which positions the rear of the trailer to receive a load. Rotating the wheels outwardly clears the lowered rear of the trailer to accommodate trailer loading for transport.

When the wheels of the Bosich trailer are in their positions for transporting a load, they are fastened together. The fastening of the two swing axles rigidly together prevents the wheels from migrating away from their transport position as the trailer moves, however, this prevents any floating of the rear wheels as the terrain undulates. The fastening is done hydro-mechanically, slowing the transition between loading and transport positions.

BRIEF SUMMARY OF THE INVENTION

A lowboy trailer has a pair of axle wheel assemblies pivotally mounted to a trailer chassis for movement between transport and loading positions such that the axle wheel assemblies are positioned across the back of the trailer chassis when they are in the transport position. Each of the axle wheel assemblies are movable up and down and sideways in order to lower the rear of the trailer chassis to the ground for loading and to clear the axle wheel assemblies from the rear of the trailer chassis so they do not interfere with the loading process. Each axle wheel assembly includes a locking tab for automatically locking the axle wheel assembly to the trailer chassis when the trailer is in its transport position. Preferably, a pocket extends from the trailer chassis to receive a locking tab on the axle wheel assembly linkage mechanism when the axle wheel assembly is moved into its transport position.

The linkage mechanism of each axle wheel assembly includes one or more hydraulic cylinders for lifting the axle wheel assembly and moving it laterally to a position that clears the back of the trailer chassis, allowing access for a load to be moved onto the trailer.

In order to convert the trailer from its transport position to the loading position, the pair of axle wheel assemblies is first lifted from the transport position to a raised position, using a hydraulic system associated with the axle wheel assembly linkage mechanism. By lifting them, the axle wheel assemblies automatically unfasten from their locking engagement with the trailer chassis pockets, freeing the axle wheel assemblies to move laterally about a vertical pivot axis associated with the axle wheel assembly linkage mechanism. Raising the axle wheel assemblies causes the back end of the trailer chassis to lower to the ground and into the trailers loading position.

While the trailer chassis is in its loading position (i.e., the axle wheel assemblies in their raised position), the axle wheel assemblies are rotated about the vertical axes so as to clear the axle wheel assemblies from the back end of the trailer chassis and loading ramps are lowered. The load (e.g., heavy machinery) is then moved onto the trailer chassis from the lowered back of the trailer chassis with loading ramps while in its loading position. After the load is completely loaded onto the trailer chassis the loading ramps are raised and, each of the axle wheel assemblies is rotated about the vertical axis so as to bring the axle wheel assembly back to its raised position behind and in line with the trailer chassis. The axle wheel assemblies are then lowered so that each of them automatically locks into the trailer chassis pockets, thereby preventing lateral movement of the axle wheel assemblies.

Each axle wheel assembly supports wheels and tires on both sides of the axle wheel assembly carrier frame where the weight of the trailer chassis and its load transfers from the trailer chassis to the wheels and tire axles. Also, the wheel and tire axle on each side of the pivot has room for two or more wheels and tires, making the wheel and tire axle safer than either two tires cantilevered to one side of the wheel and tire axle or a single tire on each side of the wheel and tire axle as a single tire blow out could cause trailer instability. Two pivots on the trailer chassis connect each axle wheel assembly to the trailer chassis. As the trailer transports a load, each of the wheel and tire axles is free to rotate about a horizontal axis extending longitudinally from front to rear of the trailer chassis, enabling wheels and tires on opposing sides of each wheel and tire axle to rotate about the axis. The rotation allows the wheels and tires to respond to changes in the elevation of the terrain between the tires on each common wheel and tire axle. Preferably, the axle of each wheel and tire axle moves independently of the other axle and each axle preferably supports four wheels and tires, with two of the wheels and tires on one side of a center support of the wheel and tire axle and the other two on the other side. This arrangement of the rear wheels assists in distributing the weight of the load as the trailer navigates uneven terrain and tends to cancel any appreciable sideways torque on either the trailer chassis or the wheel and tire axles. In effect, the opposing wheels and tires, and corresponding wheel and tire axle rotate about the horizontal axle pivot in opposing directions to compensate for changes in ground elevation across the width of the trailer as the trailer moves.

By positioning the axle wheel assemblies behind the trailer chassis when they are in their transport positions, a wider wheel base is more easily achieved then if axles and wheels extended from the sides of the trailer chassis. Plus, the relatively wide wheel base offered by positioning the axle wheel assemblies behind the trailer chassis spreads out the load over a greater ground area lessening ground bearing pressures, allowing the lowboy trailer to operate in difficult ground conditions such as soft and/or wet ground conditions. The overall width of the two, in-line axle wheel assemblies with the trailer in the transport position is substantially wider than either the trailer deck or the piece of equipment being transported, resulting in a stable and safe operation. The overall width of the two trailer axle wheel assemblies, however, is considerably less than normal haul road widths found in off-highway work sites such as open-pit mines.

The linkage mechanism for moving each of the axle wheel assemblies includes two hydraulic cylinders for controlling the raising and lowering and inward and outward slewing of the axle wheel assemblies. Although any linkage mechanism may be used to lower the axle wheel assemblies to their transport position, two alternative mechanisms are illustrated herein. In the first embodiment of the linkage mechanism, the hydraulic cylinder that lifts and lowers each of the axle wheel assemblies supports little or no weight of the trailer chassis and its load when the axle wheel assemblies are in their transport position. In an alternative embodiment, the hydraulic cylinder associated with each of the linkage mechanisms for moving the wheel assemblies between raised and lowered positions supports a significant amount of the weight of the loaded trailer when the trailer is in its transport position. In this regard, the weight on the axle wheel assemblies from the weight of the trailer chassis and the weight of its load is supported through the hydraulic cylinder when the trailer is in its transport position.

Preferably, the trailer includes a gooseneck for hitching to a fifth wheel mounted to a towing tractor. During the loading process, the trailer is positively anchored by the towing tractor. The trailer will not squirt out from under a piece of equipment as it is being loaded onto the trailer.

Additionally the deck of the trailer is preferably angled in line with the trailer's loading ramps in order to minimize any apex in the loading surface in the area where the ramp transitions to the trailer deck. Minimizing or eliminating the loading apex then minimizes or eliminates any concentration of load on both the trailer chassis and on any undercarriage of the equipment being loaded during the trailer loading process, which also minimizes or eliminates any potential equipment instability as equipment is loaded onto the trailer.

The trailer preferably uses standard OEM spindles, bearings, hubs, and brakes such as Caterpillar truck rear spindles for the truck axle model nos. 773F, 775F, 777F, 785C, 789C, 793C and 797B. The different models differ by their weight ratings and, therefore, the selection of a particular spindle model depends on the desired weight rating for the trailer. These spindles have mechanical oil cooled disc brakes that provide substantial braking capacity. When combined with the brakes of the tractor, substantial braking capacity results.

BRIEF DESCRIPTION OF THE DRAWINGS

FIGS. 1 and 1A illustrate a side view of a tractor trailer in accordance with one embodiment of the invention, showing the trailer in a transport position.

FIG. 1B shows an axle wheel assembly of the trailer raised off a ground surface, resulting in the back end of the trailer chassis being lowered to the ground, FIG. 1C shows the axle wheel assemblies rotated outwardly so they are clear of an approach to the rear of the trailer chassis and FIG. 1D shows a ramp lowered and extending back from the trailer chassis in order to facilitate the loading of equipment onto the trailer.

FIGS. 1E through 1J are the same side view of FIGS. 1A-1D and illustrate snapshots in a process of loading a self-propelled, excavator onto the trailer. Specifically, FIGS. 1E and 1F illustrate the self-propelled, excavator loading onto the trailer of FIG. 1D. FIGS. 1G and 1H illustrate the ramp pivoting about the back end of the trailer chassis as the ramp moves from a position for loading equipment such as the illustrated excavator to a transport position. FIGS. 1I and 1J illustrate the movement of the wheel assemblies from their raised, out-of-the-way position in FIG. 1H to their raised in line position in FIG. 1I to their lowered, load-carrying position illustrated in FIG. 1J.

FIGS. 1K through 1O are the same side view of FIGS. 1A-1D and 1E through 1J and illustrate snapshots in a process of unloading the self-propelled, excavator of FIGS. 1E through 1J from the trailer. Specifically, FIG. 1K illustrates the movement of the wheel assemblies from their lowered, load-carrying position in FIG. 1J to a raised position that lowers the back of the trailer chassis to the ground as suggested by the opposing arrows in FIG. 1K. FIG. 1L illustrates the wheel assemblies moving to their out-of-the-way position that clears the lowered back end of the trailer. FIG. 1M illustrates the ramp pivoting about the rear of the trailer chassis to the ramp's lowered position for unloading the excavator. FIGS. 1N and 1O illustrate the excavator moving off the trailer, over the ramp and onto the ground.

FIG. 6 illustrates the trailer and its axle wheel assemblies in the transport position.

FIG. 7 illustrates the trailer with the axle wheel assemblies raised vertically and the trailer's rear edge lowered to the ground.

FIG. 8 illustrates the trailer with each of the raised axle wheel assemblies rotating outwardly from the trailer chassis to show the passenger side pocket secured to the trailer chassis that works to laterally secure the axle wheel assemblies when the axle wheel assemblies are locked in their transport position and to illustrate the lowered rear end of the trailer chassis cleared so as to allow loading and unloading of equipment carried by the trailer.

FIG. 9 illustrates the trailer with each of the raised axle wheel assemblies rotating inwardly to return the axle wheel assemblies to an elevated position vertically in line with their transport position.

FIG. 10 illustrates the trailer with the axle wheel assemblies lowering from the elevated position of FIG. 9 to the transport position such that the axle wheel assemblies linkage mechanism locking tabs are received by the trailer chassis pockets so as to lock the axle wheel assemblies in line with the trailer chassis, thereby automatically securing the axle wheel assemblies side to side in the transport position.

FIGS. 13-17 are perspective views taken from the driver's side of the trailer with the wheels and tires axle of the axle wheel assemblies removed to better illustrate movement of the axle wheel assembly linkage mechanism in response to action by hydraulic cylinders of each axle wheel assembly, where each of the figures is a snapshot of the trailer chassis as the axle wheel assemblies move between their transport and loading positions.

FIG. 13 illustrates the axle wheel assemblies in their transport position of FIG. 6 and the linkage mechanism locking tabs docked to the trailer chassis pockets.

FIG. 14 illustrates the axle wheel assemblies in the raised position of FIG. 7, which automatically frees the linkage mechanism locking tabs from the restraints of the trailer chassis pockets.

FIG. 15 illustrates the raised axle wheel assemblies rotating outwardly as shown in FIGS. 8, 8A and 8B.

FIG. 16 illustrates the raised axle wheel assemblies rotating inwardly as shown in FIG. 9 to a position in which the linkage mechanisms are inline with the trailer chassis and the axle wheel assembly linkage mechanisms are vertically aligned with the pockets of the trailer chassis for docking the axle wheel assemblies into the trailer chassis pockets by lowering the axle wheel assemblies to their transport position.

FIG. 17 illustrates the axle wheel assemblies lowered from their raised positions in FIG. 16 to the transport position so as to dock the linkage mechanism locking tabs into the trailer chassis pockets, thereby restraining undesired side to side lateral movement of the axle wheel assemblies in the transport position.

FIG. 18 illustrates the axle wheel assembly in an axle-down position and two links of the linkage mechanism in a "locked-up" or "deadman" mode with the hydraulic cylinder holding the two links in a straight line.

FIG. 19 illustrates the axle wheel assembly in an axle-up position with the hydraulic cylinder raising up the pivot point joining the two "locked-up" or "deadman" links of FIG. 18 so as to break their in-line "locked-up" alignment.

FIG. 20 illustrates a side view of the rear of the trailer chassis incorporating the axle wheel assembly of FIGS. 18-19, with the linkage mechanism of the axle wheel assembly in the position illustrated in FIG. 18 (i.e., axle down relative to the trailer deck).

FIG. 21 illustrates a side view of the trailer in the position the trailer assumes with the axles up as shown in FIG. 19, where the axle wheel assembly is not illustrated to better show the ramp extending from the rear of the trailer chassis in a single plane from the trailer deck toward the ground surface.

FIG. 23 illustrates the axle wheel assembly in an axle-down position with a hydraulic cylinder of the linkage mechanism extended in order to hold the axle wheel assembly in its axle-down position.

FIG. 24 illustrates the axle wheel assembly in an axle-up position with the hydraulic cylinder retracted to hold the axle wheel assembly in the axle-up position.

FIG. 25 illustrates a side view of the rear of the trailer chassis incorporating the axle wheel assembly of FIGS. 23-24, with the linkage mechanism in the position illustrated in FIG. 23 (i.e., axle down relative to the trailer deck).

DETAILED DESCRIPTION OF THE INVENTION

Figure 1B:
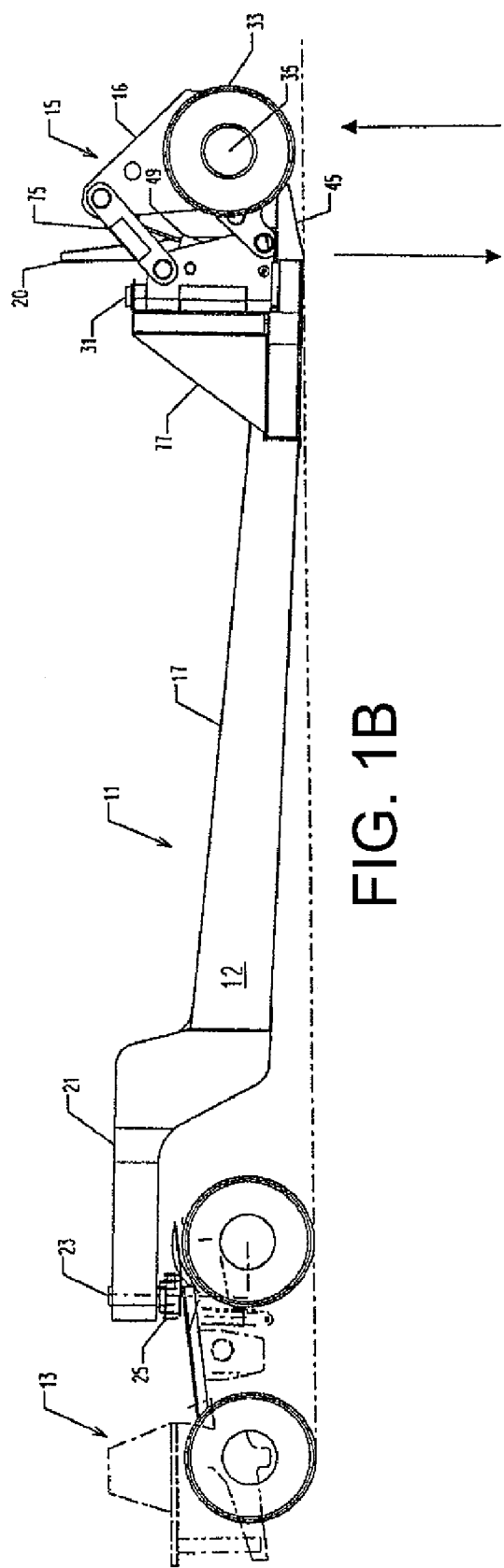
FIGS. 1B, 1C and 1D are the same side view of FIG. 1A and illustrate a sequence of positions of the tractor trailer in FIG. 1A, transitioning the trailer from its transport position to a loading position, where

Turning to the drawings and referring first to FIGS. 1A through 1O, a trailer 11 is supported by a tractor 13 at the front of the trailer 11 and by a pair of axle wheel assemblies 15 at the back of the trailer 11. In the following description of the axle wheel assemblies 15, reference is often made to one of the axle wheel assemblies 15 with the understanding that each of the axle wheel assemblies 15 is the mirror image of the other. Those skilled in the art of designing trailers of the type illustrated and described herein will appreciate that the following description referencing one of the axle wheel assemblies 15 applies equally well to the other axle wheel assembly 15.

The trailer 11 includes trailer chassis 12, having a deck 17 for carrying a load such as a self-propelled, excavator 19 shown in FIGS. 1E through 1O. In the illustrated embodiment, the deck 17 of the trailer chassis 12 is angled so as to provide a substantially flat single planar surface between the deck 17 and a ramp 20, when the ramp 20 is positioned to span the rear of the trailer chassis 12 and the ground surface 29 as explained more fully hereinafter.

The trailer 11 includes a "gooseneck" 21 at its front that supports a hitch 23 for mating to fifth-wheel coupling 25 mounted to the tractor 13. The tractor 13 is a conventional tractor for pulling trailers via a fifth-wheel connection. Any number of different and conventional hitches can be used to secure the trailer 11 to the fifth-wheel of the tractor 13. Although other types of hitches can be used to connect the trailer 11 to the tractor 13, the gooseneck 21 and fifth wheel coupling 25 are particularly well suited for heavy loads and, therefore, a desirable configuration of a hitch connecting the tractor 13 and trailer 11, which is designed to carry very heavy loads.

The axle wheel assemblies 15 support the rear of the trailer chassis 12 and are secured to the trailer 11 as explained more fully hereinafter and include linkage mechanisms 27 for raising and lowering the axle wheel assemblies 15 in order to transition the trailer 11 between transport and loading positions. Depending on the design details such as the size of the axle wheel assembly axle spindles, the trailer 11 can carry loads in excess of 1500 tons. The trailer 11 is most often used to carry heavy, earth moving machinery from one working site to another. Often the earth moving machinery is self-propelled, but the earth moving machinery is not made to "road" travel significant distances. Rather, the machinery has the ability to move within a work area but not readily between work areas. Trailers such as the one illustrated here provide a vehicle for transporting the machinery among different work areas or work sites.

To transport heavy machinery from one work site to another, the machinery must be loaded onto the deck 17 of the trailer chassis 12. The machinery can be loaded by a crane (not shown) and some equipment is loaded in this way. However, self-propelled machinery can load themselves onto the trailer chassis 12 if they are able to navigate the transition from a ground surface 29 in FIGS. 1A through 1O to the trailer chassis deck 17. To accomplish this, the rear of the trailer chassis 12 is lowered to the ground surface 29 and the ramp 20 is lowered from its raised position in FIG. 1A. The machinery then is able to move itself up the ramp 20 and onto the deck 17 of the trailer chassis 12.

The following description follows FIGS. 1A through 1J to describe how the rear of the trailer chassis 12 is lowered to the ground surface 29 and the self-propelled excavator 19 loads itself onto the trailer.

Figure 1C:
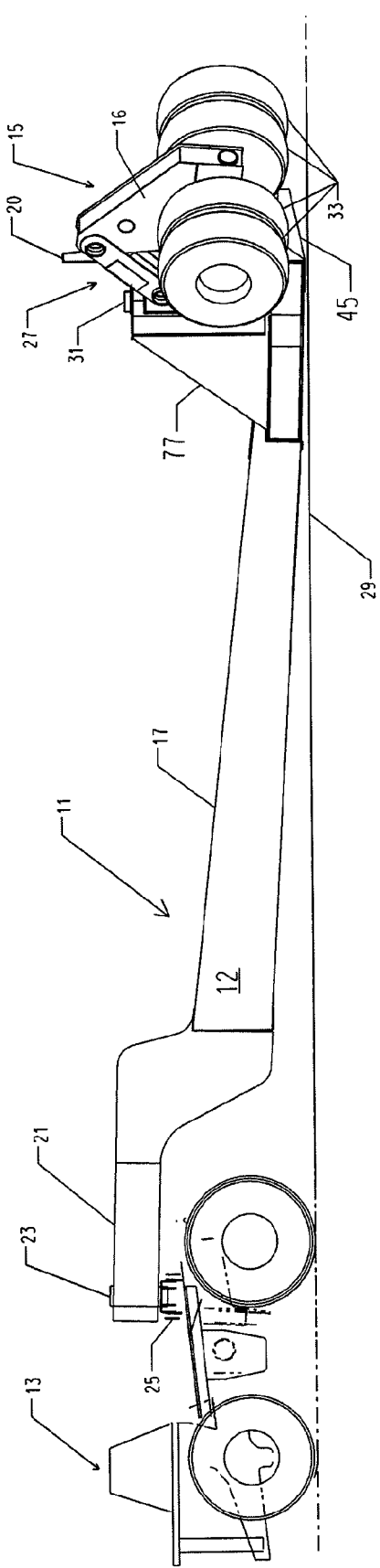

To lower the rear of the trailer chassis 12, the axle wheel assemblies 15 are raised as illustrated in FIG. 1B, which lowers the rear of the trailer chassis 12 as indicted by the opposing arrows in FIG. 1B. Once each of the two axle wheel assemblies 15 are in their raised position as illustrated in FIG. 1B, the axle wheel assemblies become unlocked from the trailer chassis 12 as explained more fully hereinafter and are able to rotate laterally about a pivot 31. A hydraulic cylinder 37 in FIGS. 1A-1O rotates each of the axle wheel assemblies 15 outwardly as illustrated in FIG. 1C in a sort of slewing action, the axle wheel assemblies 15 are raised high enough for the bottom of the tires 33 to clear the ground surface 29.

Figure 1D:
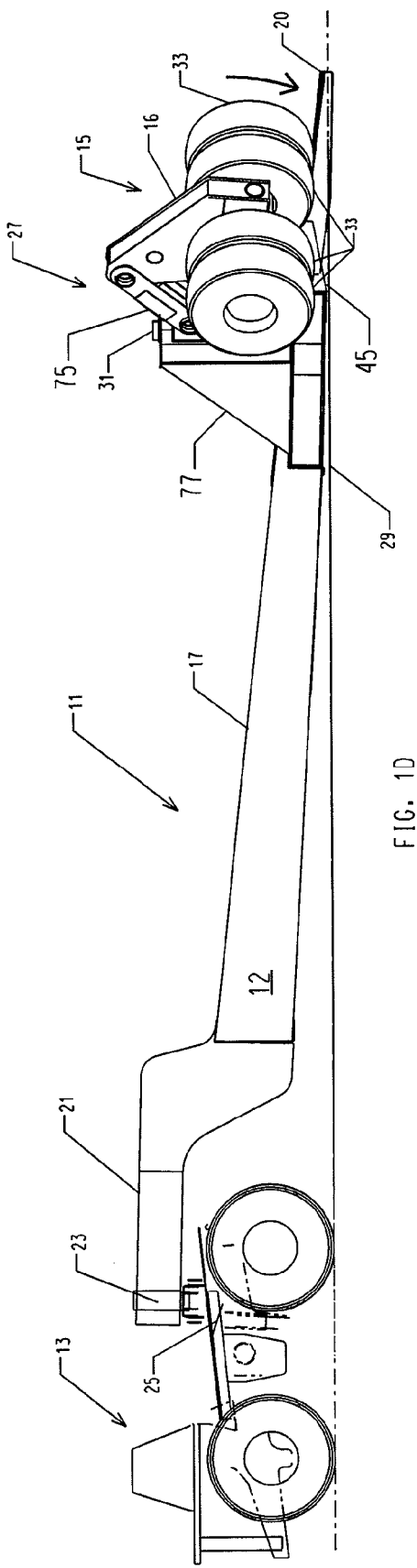
Figure 1E:
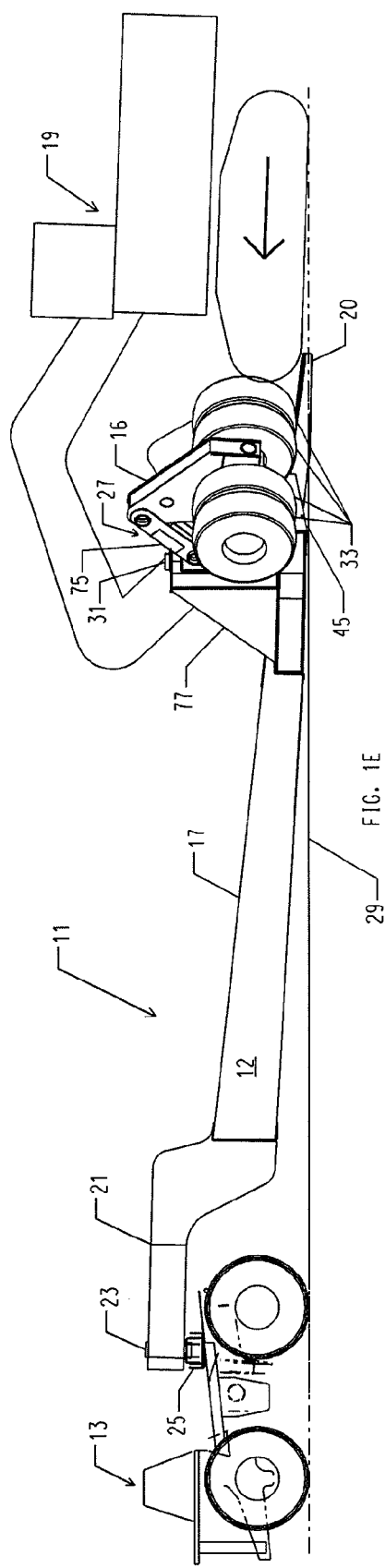
Figure 1F:
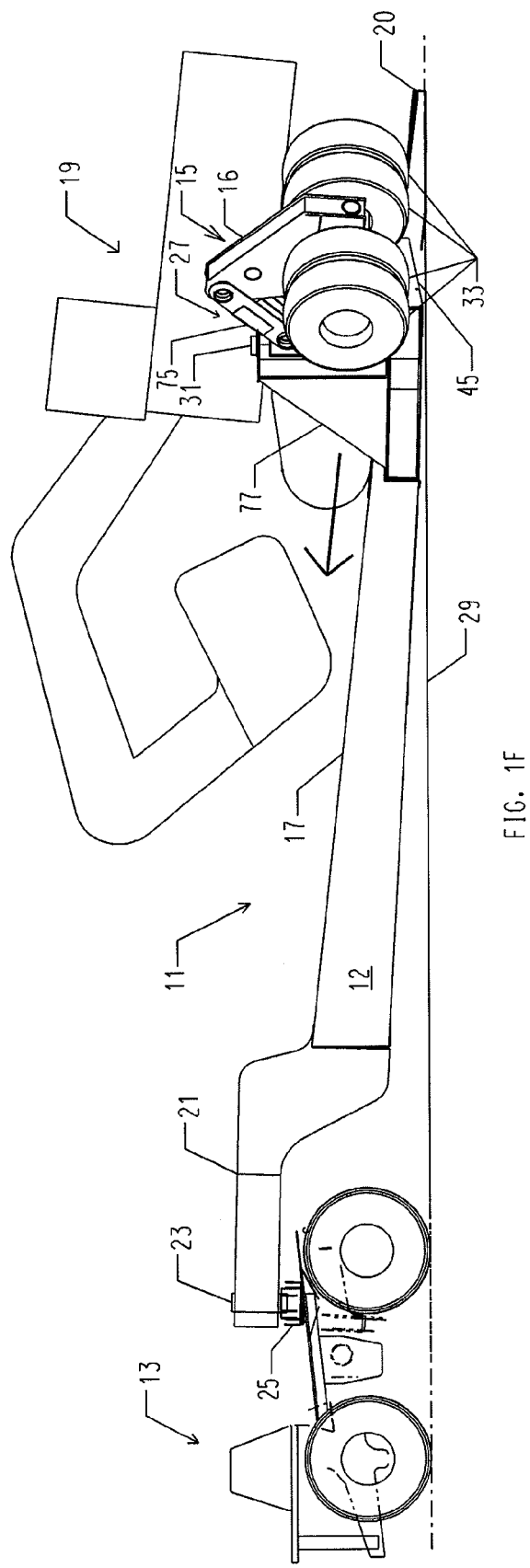

The ramp 20 then is lowered from the transport position shown in FIG. 1B by a hydraulic cylinder "59" to a loading position shown in FIG. 1D.

In its loading position, the deck of the ramp 20 spans the ground surface 29 and the deck 17 of the trailer chassis 12. The angle of the ramp 20 substantially matches the angle of the deck 17 of the trailer chassis 12 so that any apex created by differences in the angles between the ramp 20 and the deck 17 at their transition is minimized or eliminated and a flat single plane loading surface is established. Thus, the self-propelled excavator 19 in FIGS. 1E, 1F and 1G loads itself onto the trailer chassis 12 without crossing over an area of transition between the ramp 20 and the deck 17 that could concentrate the transfer of the weight of the excavator 19 or other machinery, if however the transition has a large apex; this could create a fulcrum causing the machinery to rock forward and backward as the center of gravity of the machinery shifts from the back of the apex to its front as the machinery loads itself. The undercarriage of machinery of the type typically carried by this trailer such as excavator 19 is not designed to have a single point—concentrated load applied to it such as by a loading apex, if such a load is applied to the undercarriage supporting this machinery it typically fails or malfunctions.

Figure 1H:
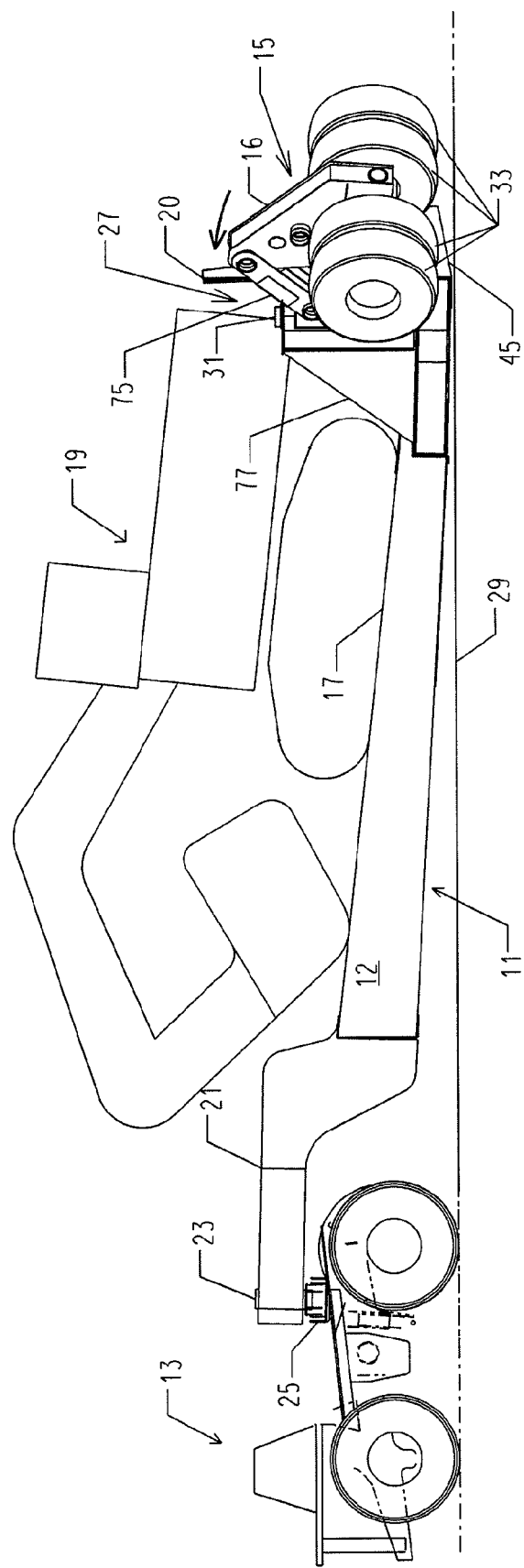
Figure 1I:
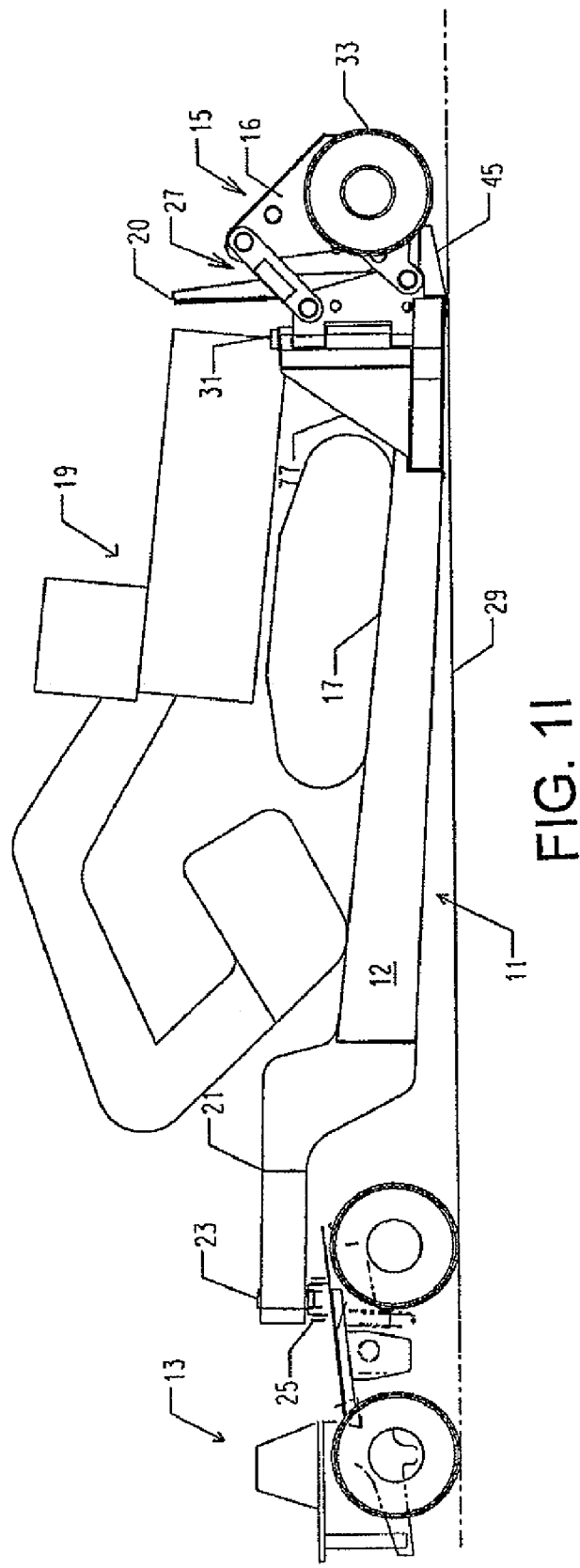
Figure 1J:
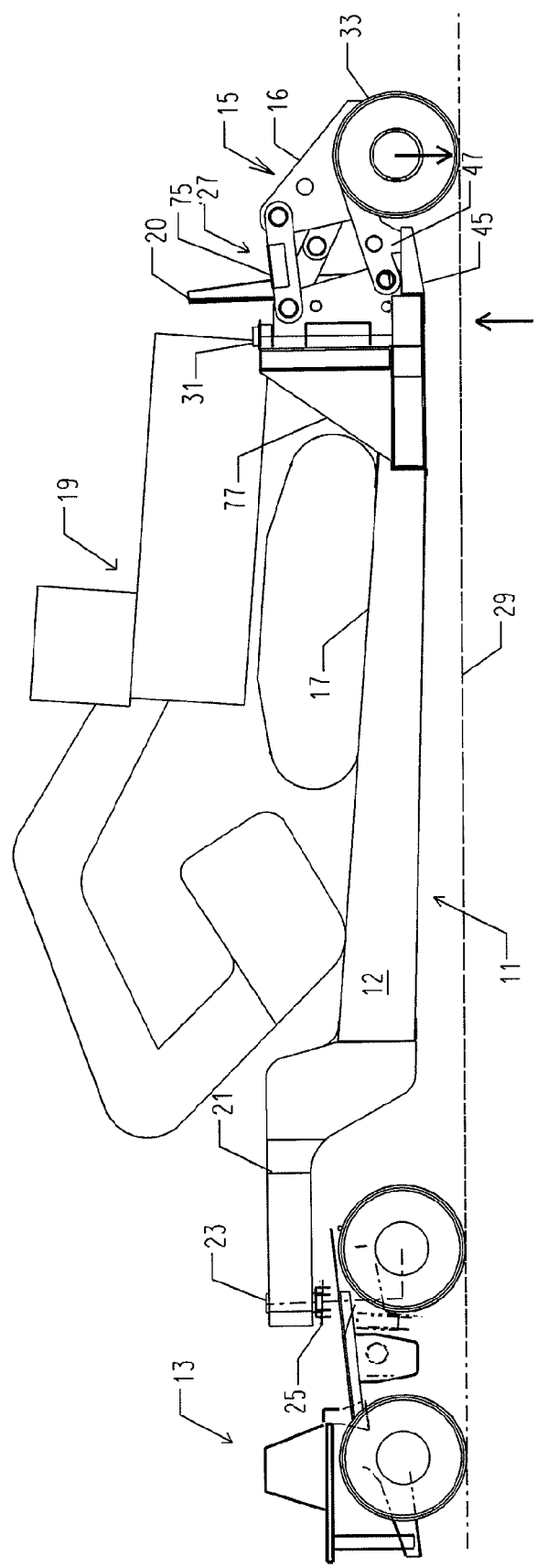

After the excavator 19 is loaded in FIG. 1G, the ramp 20 is raised by hydraulic cylinder "59" to its transport position as indicated by the arrows in FIGS. 1G and 1H. With the ramp 20 in its transport position, each of the axle wheel assemblies 15 is rotated laterally about the pivot 31 back to their raised, but in-line with trailer chassis deck 17, position illustrated in FIG. 1I, which is the same position the axle wheel assemblies 15 were in after lowering the rear of the trailer chassis 12 in FIG. 1B. The same hydraulic cylinder 37 that rotated each of the axle wheel assemblies 15 outwardly also rotates the axle wheel assemblies 15 inwardly. As explained more fully hereinafter, when the axle wheel assemblies 15 are in their raised and in-line position of FIG. 1I, the linkage mechanism 27 of each axle wheel assembly 15 is positioned to automatically engage a pocket 45 fixed to the trailer chassis 12 when the axle wheel assemblies 15 are lowered to their transport position shown in FIG. 1J, this pocket 45 functions to lock the axle wheel assemblies 15 in line with the trailer chassis 12, thereby preventing lateral rotation about the pivot 31. Each of the axle wheel assemblies 15 is moved between its raised and lowered or transport position by a second hydraulic cylinder 49.

After the excavator 19 is transported to another location by the trailer 11 pulled by the tractor 13, the excavator 19 is unloaded in a process that is essentially the reverse of the loading process described above in connection with FIGS. 1A through 1J.

Figure 1K:
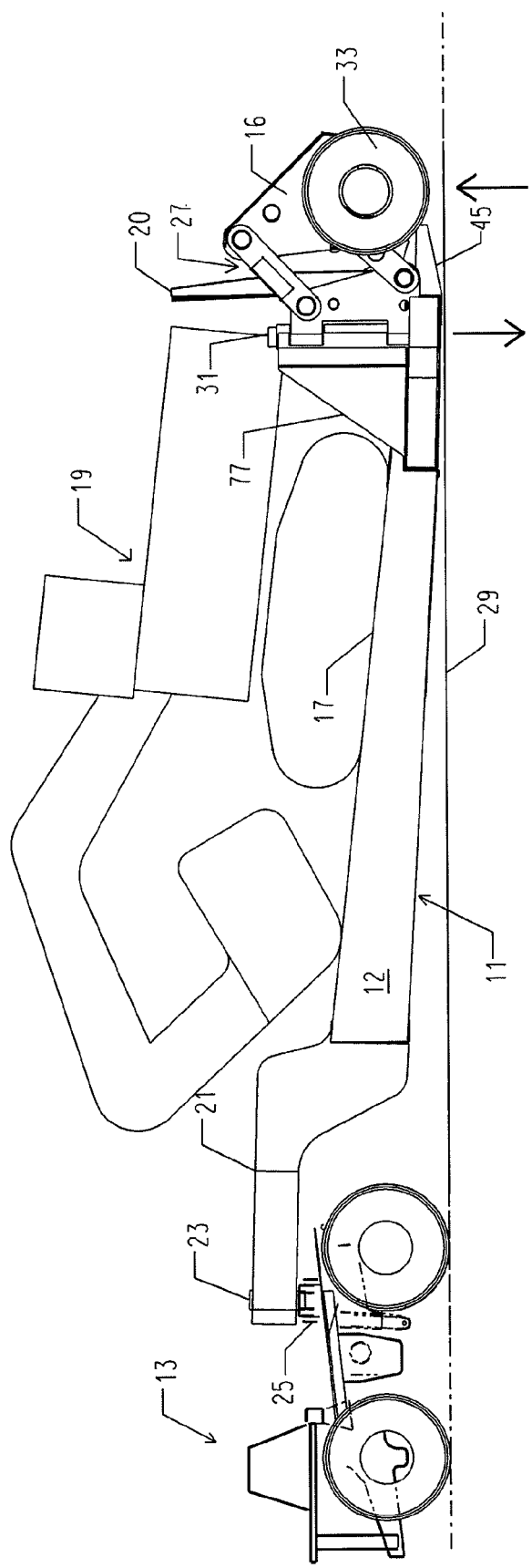
Figure 1L:
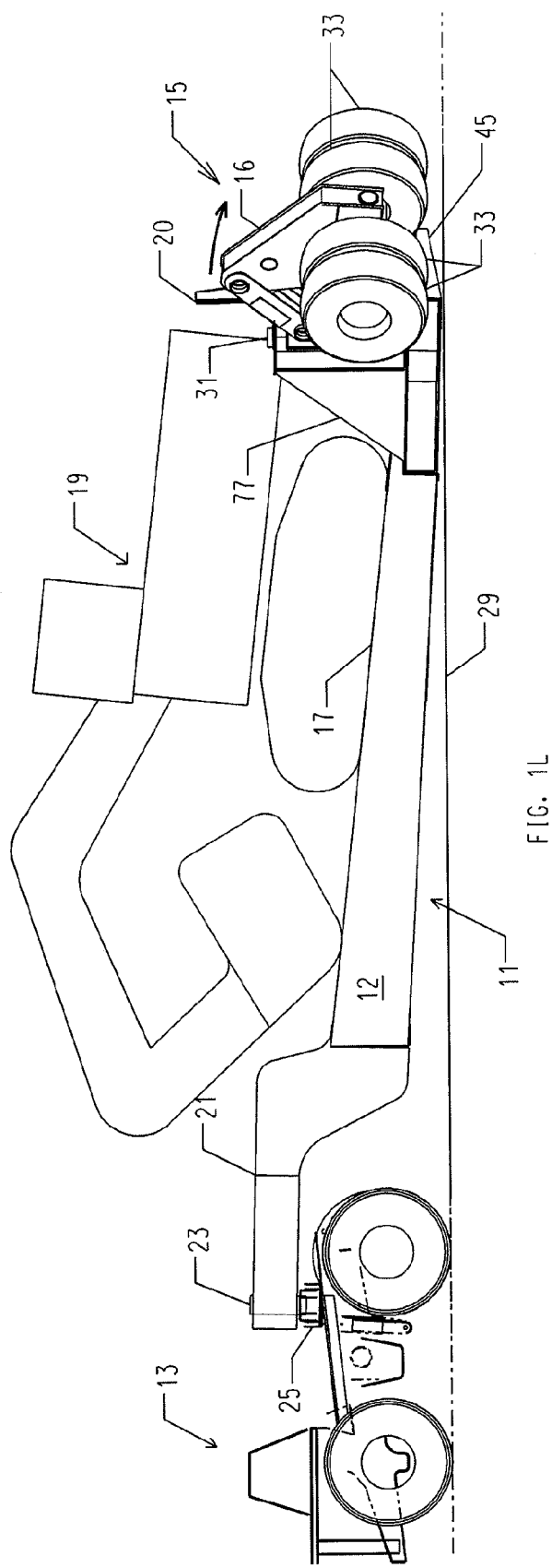
Figure 1M:
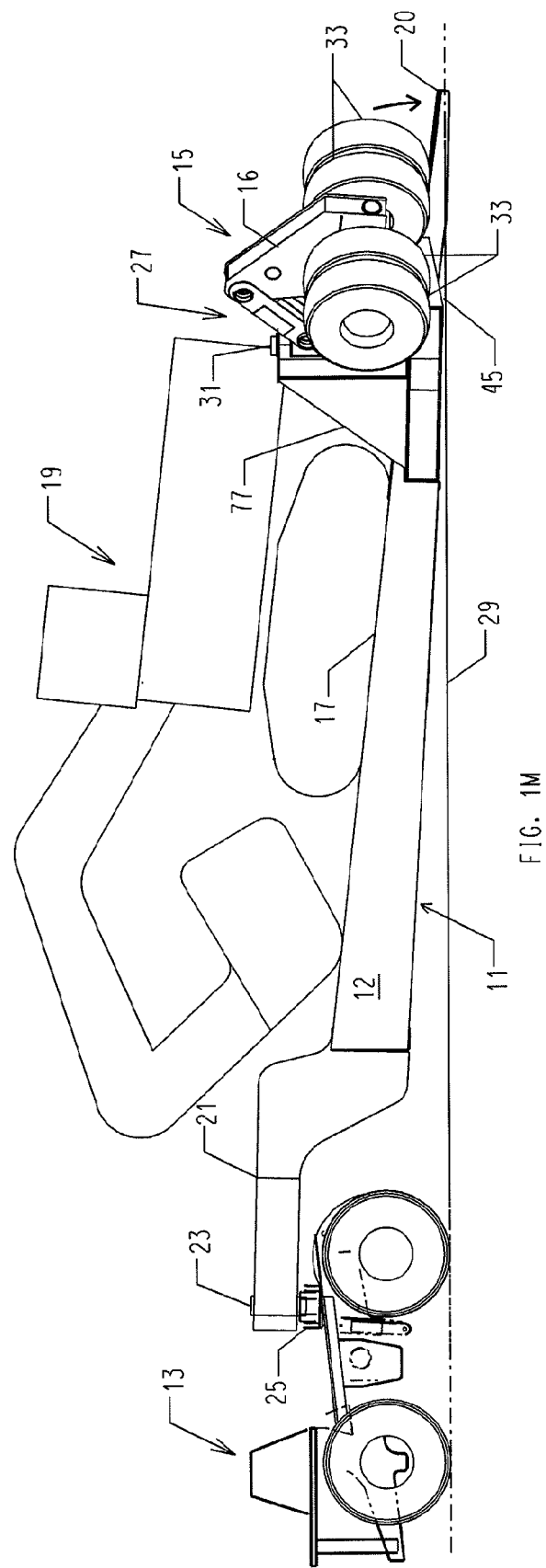
Figure 2:
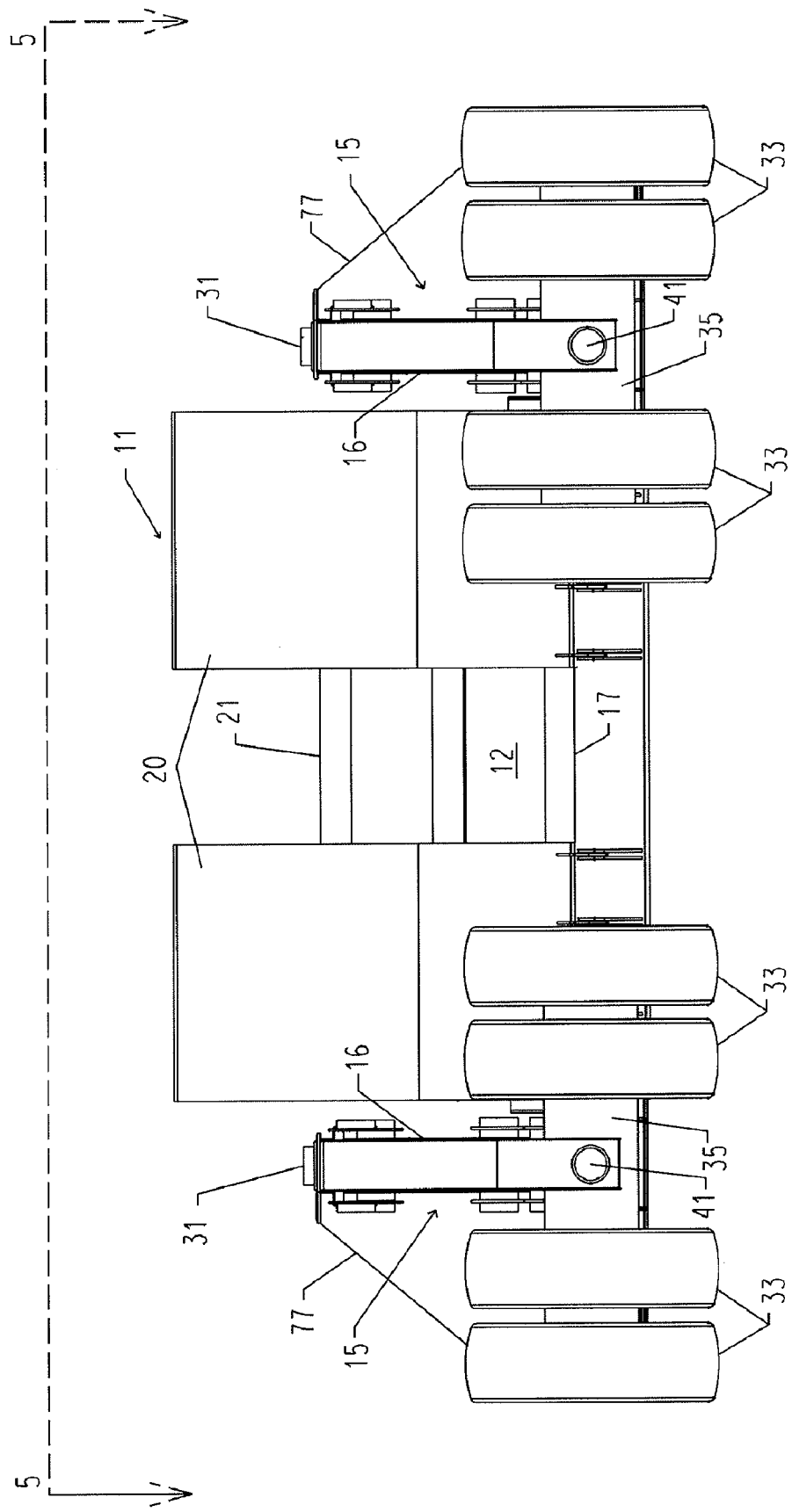
FIG. 2 is an end view of the trailer of FIG. 1A taken along the line 2-2 in FIG. 1.

Referring to FIGS. 1K through 1O, after arriving at the destination for the excavator 19, the axle wheel assemblies 15 are raised as illustrated in FIG. 1K. Lifting the axle wheel assemblies 15 lowers the rear of the trailer chassis 12 to the ground surface 29 in the same manner as the trailer chassis 12 was lowered for loading the excavator 19 in FIG. 1B. Similarly, the raised axle wheel assemblies 15 are rotated outwardly in FIG. 1L by hydraulic cylinders 37 in the same manner as the axle wheel assemblies 15 were rotated outwardly in FIG. 1C. Once the axle wheel assemblies 15 are clear of the lowered rear of the trailer chassis 12, the ramp 20 is lowered by hydraulic cylinder "59" as shown in FIG. 1M. In keeping with the analogy of the process of loading the excavator 19, the positioning of the ramp 20 in FIG. 1M to unload the excavator 19 is the same as the positioning of the ramp 20 in FIG. 1D for loading the excavator 19. As suggested by the similar illustrations in FIGS. 1N and 1F but for the direction of the arrow in the two drawings, the trailer 11 in FIG. 1N is now positioned to enable the excavator 19 to move from the deck 17 to the ground surface 29 in essentially the reverse motion the excavator 19 took to load itself onto the trailer 11. In FIG. 1O the excavator 19 is completely off the trailer 11 and free to position itself in the area of its destination for beginning the task it was transported to do. Not shown in the drawings is the sequence of steps taken after the excavator 19 is unloaded in order to return the trailer 11 to its transport position. Those steps are the same as those illustrated in FIGS. 1G through 1J.

Referring now to FIGS. 2-5, each of the axle wheel assemblies 15 extends both outward and inwardly of the trailer chassis 12 when viewed from the rear of the trailer 11. The four wheel and tire pairs 33 mounted to each wheel and tire axle 35 of the axle wheel assemblies 15 span a distance across the back of the trailer chassis 12 that provides a wide support base for distributing the weight of the trailer chassis 12 and its load. As best seen in the top view of the rear of the trailer chassis 12 in FIG. 5, each of the axle wheel assemblies 15 includes a hydraulic cylinder 37 anchored at one end to the trailer chassis 12 and at the other end to the hinge assembly 43 of the axle wheel assembly 15. The stroke of the hydraulic cylinder 37 moves the axle wheel assembly 15 outwardly and inwardly with the axle wheel assembly 15 is in its raised position.

Figure 3:
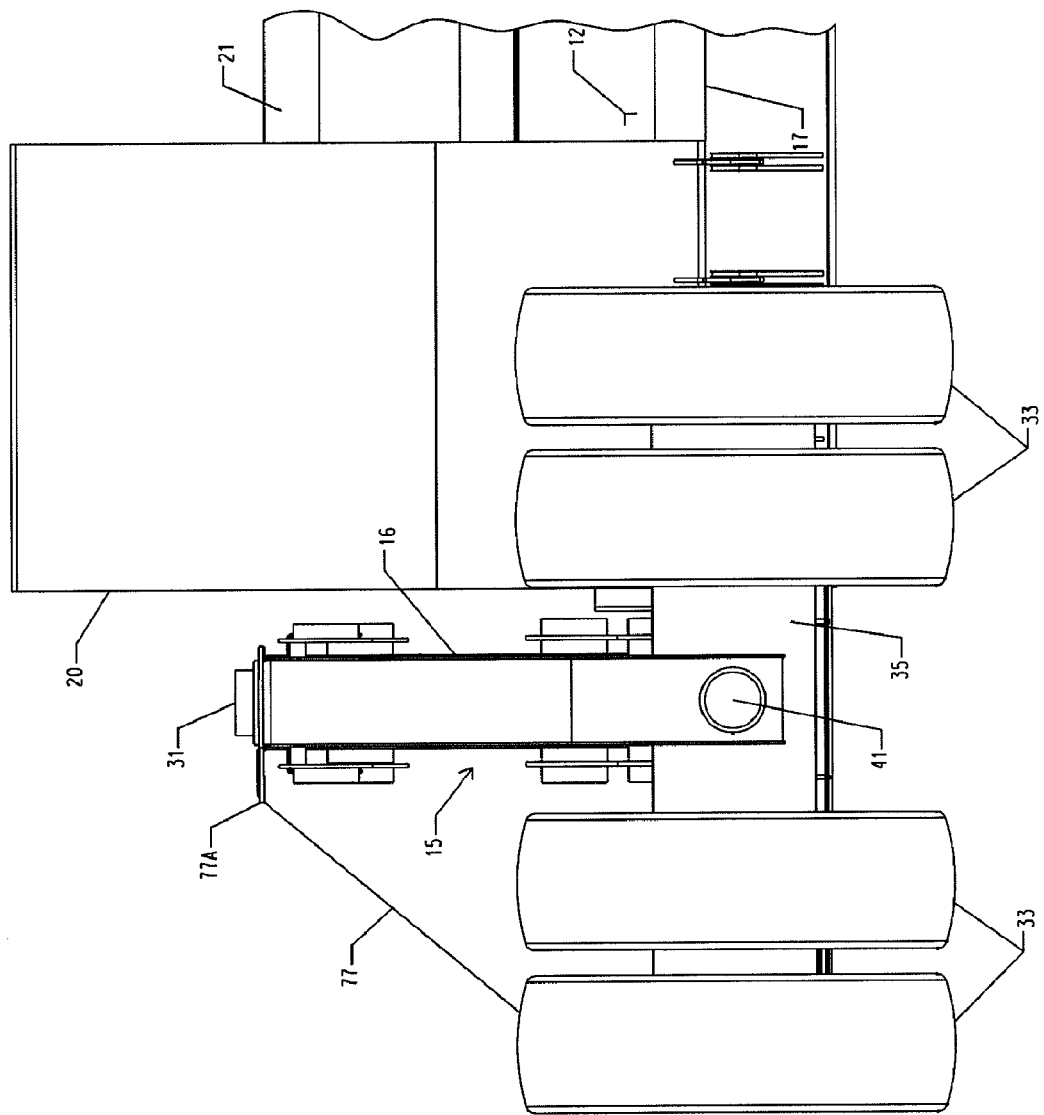
FIG. 3 illustrates a close up view of the driver's side axle wheel assembly illustrated in FIG. 2.
Figure 4:
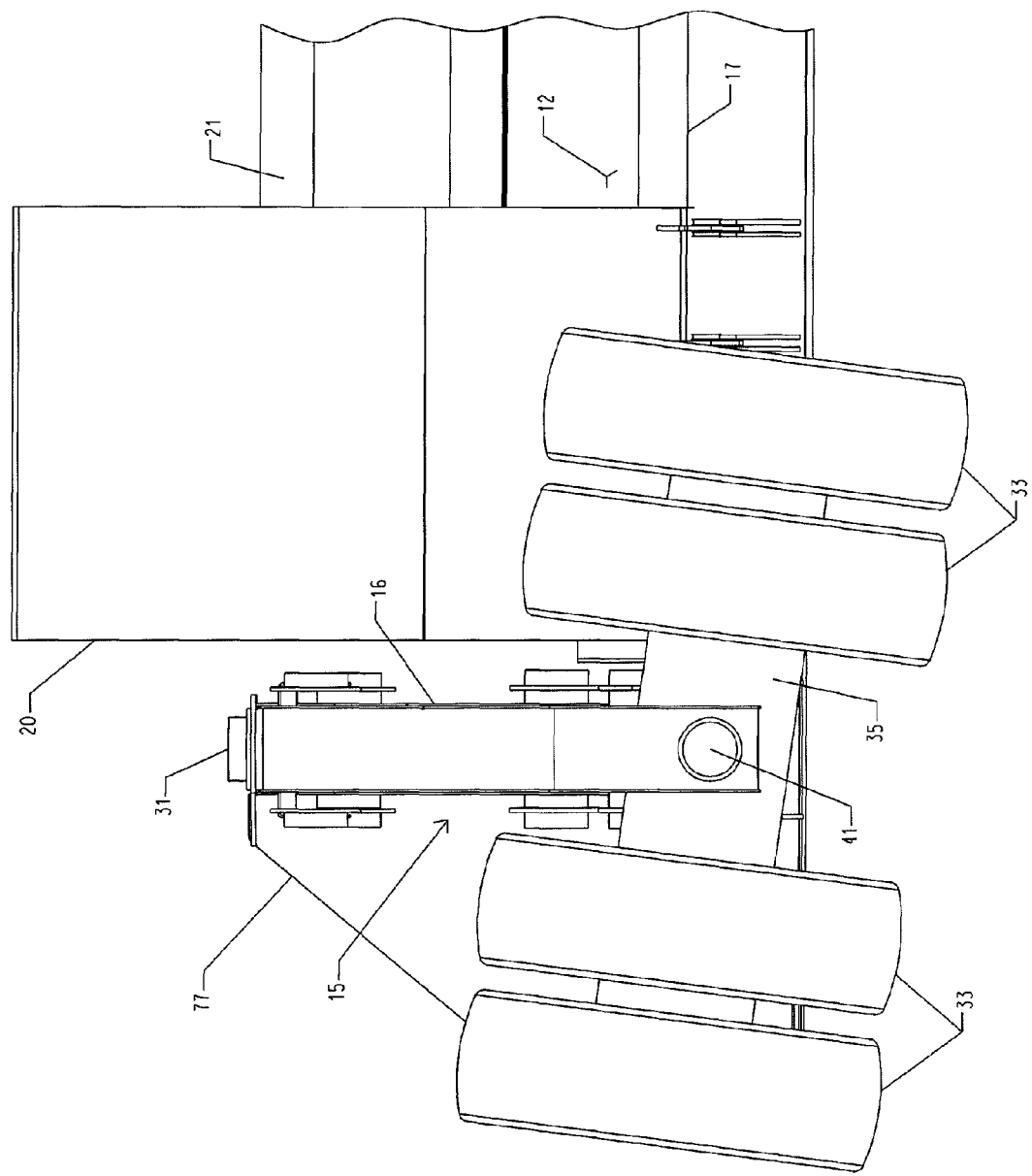
FIG. 4 illustrates the same view of the driver's side axle wheel assembly as shown in FIG. 3 with the wheel and tire axle rotating about an axis extending into the page as provided by a linkage mechanism securing the axle wheel assembly to the trailer chassis.
Figure 5:
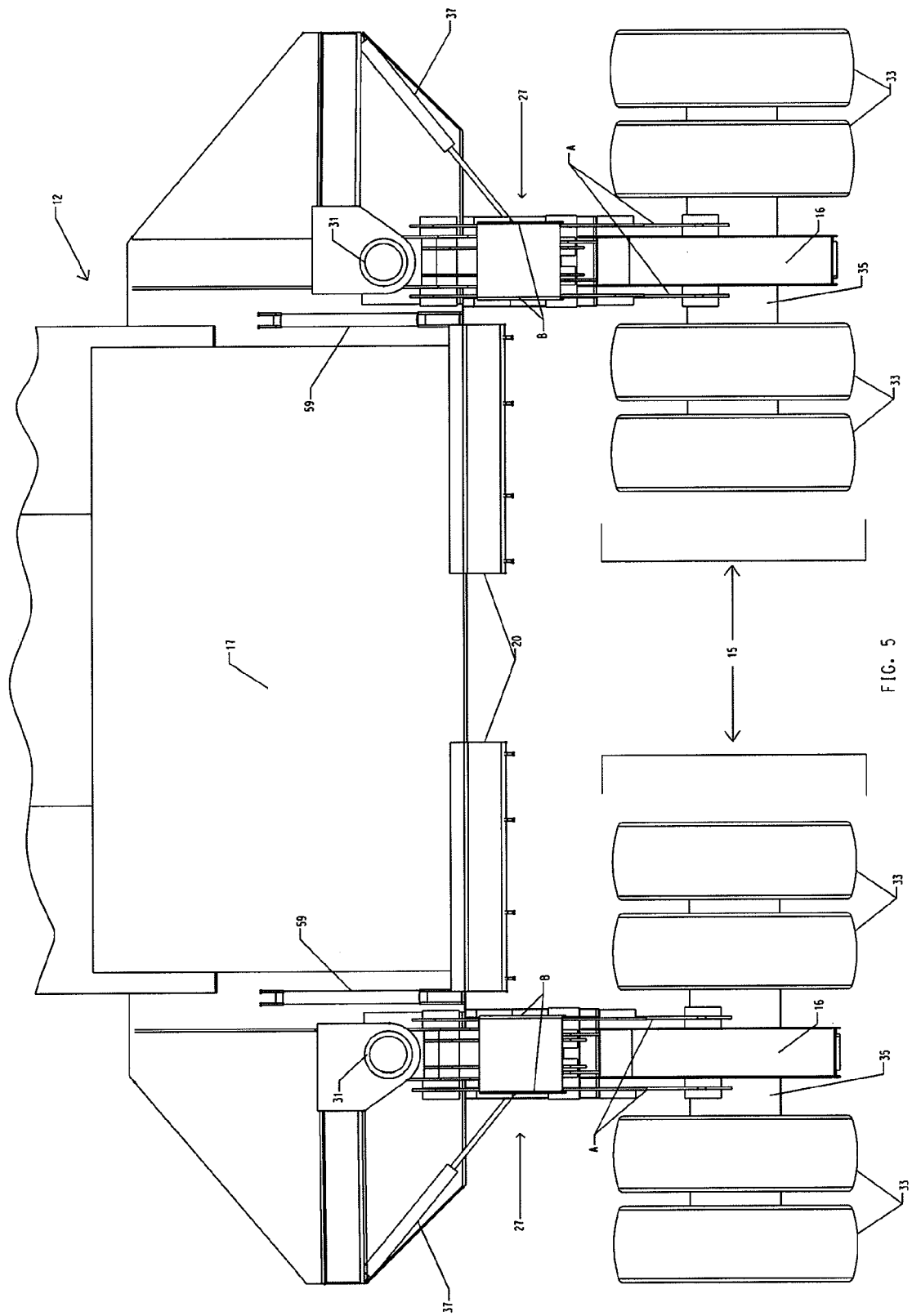
FIG. 5 is a top view of the back portion of the tractor trailer of FIG. 1 taken along the line 5-5 in FIG. 2.

A pivot 41, best seen in FIGS. 3 and 4, supports the wheel and tire axle 35 of each axle wheel assembly 15 in a carrier frame 16, which in turn is secured to one end of the linkage mechanism 27. The pivot 41 allows the wheel and tire axle 35 to rotate about an axis extending out of the page from the pivot 41 in FIGS. 3 and 4. FIG. 4 shows the movement of the wheel and tire axle 35 and the pairs of wheels and tires 33 mounted thereon about the axis. The rotation of the wheel and tire axle 35 about the axis of the pivot 41 allows the pairs of wheels and tires 33 mounted to the wheel and tire axle 35 to rotate essentially up and down in response to changes in the elevation of the ground surface 29. This up-and-down motion helps maintain a distribution of the weight carried by each of the axle wheel assemblies 15 across all of the wheel and tire pairs 33 when the trailer 11 encounters an area of the ground surface 29 that is uneven across the four wheel and tire pairs of the two axle wheel assemblies 15.

Figure 6:
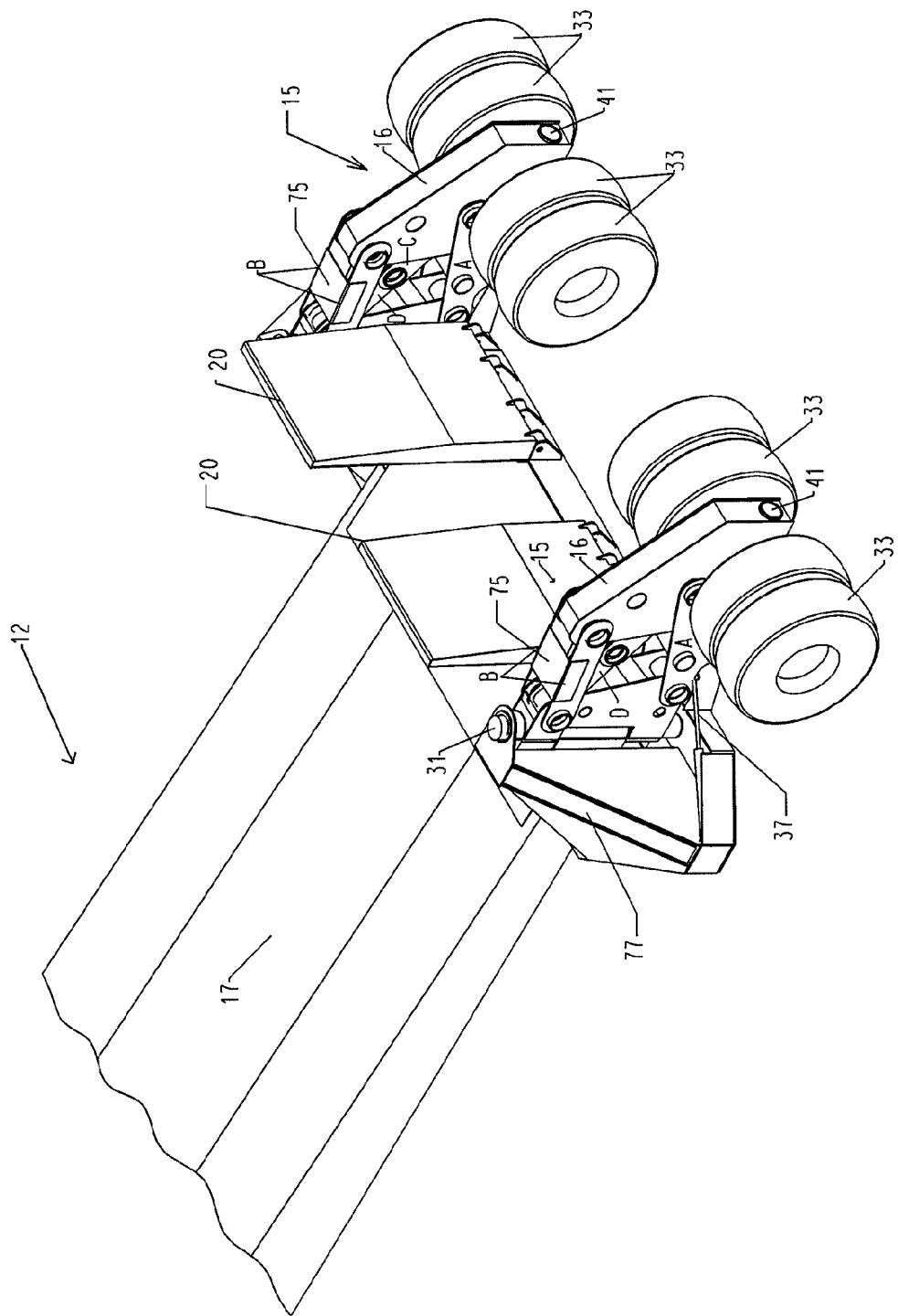
FIGS. 6-10 are perspective views of the tractor trailer of FIG. 1 taken from the driver's side back corner of the trailer, illustrating snapshots of the trailer as it moves from the transport position to a loading position and then back to the transport position.
Figure 7:
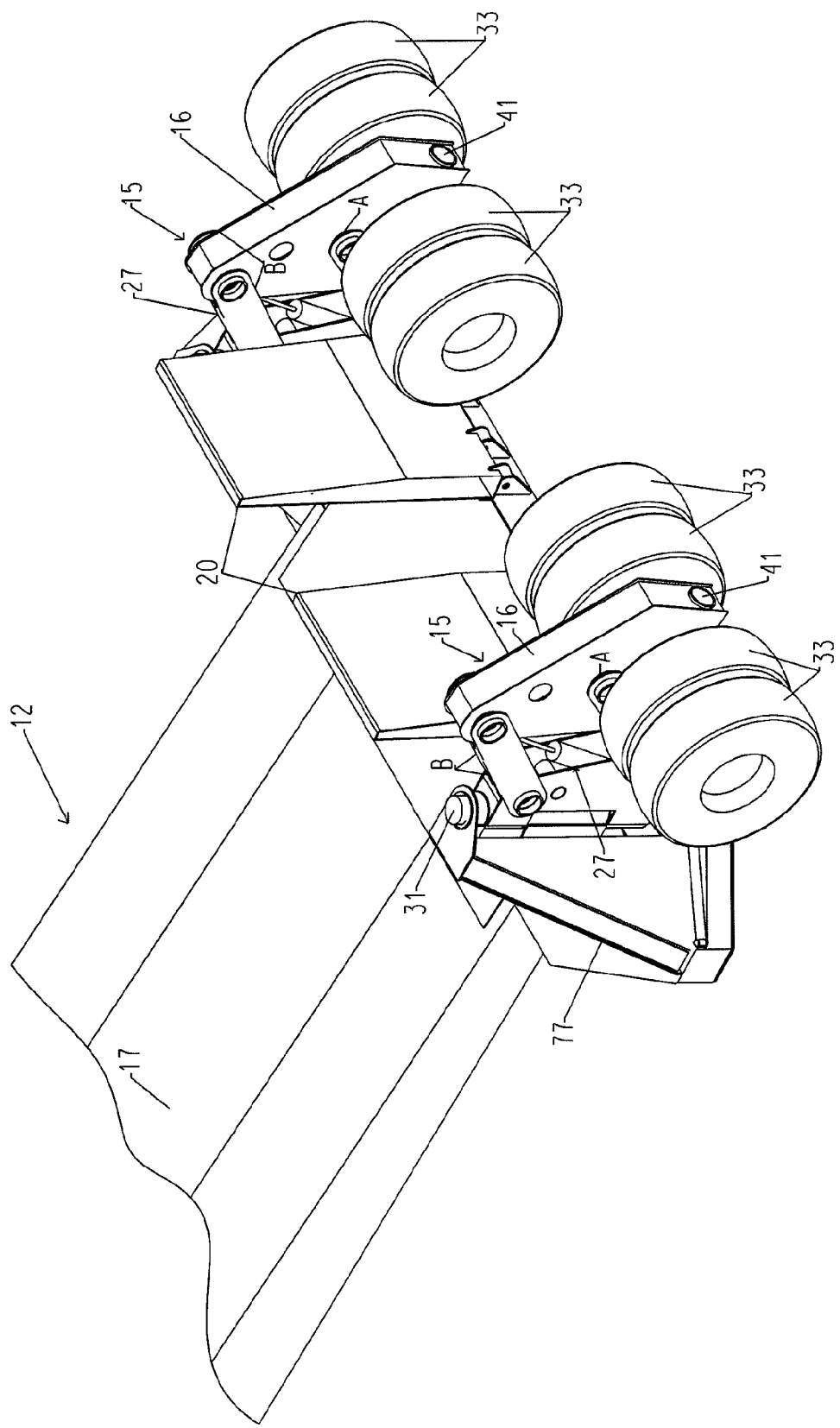
Figure 8:
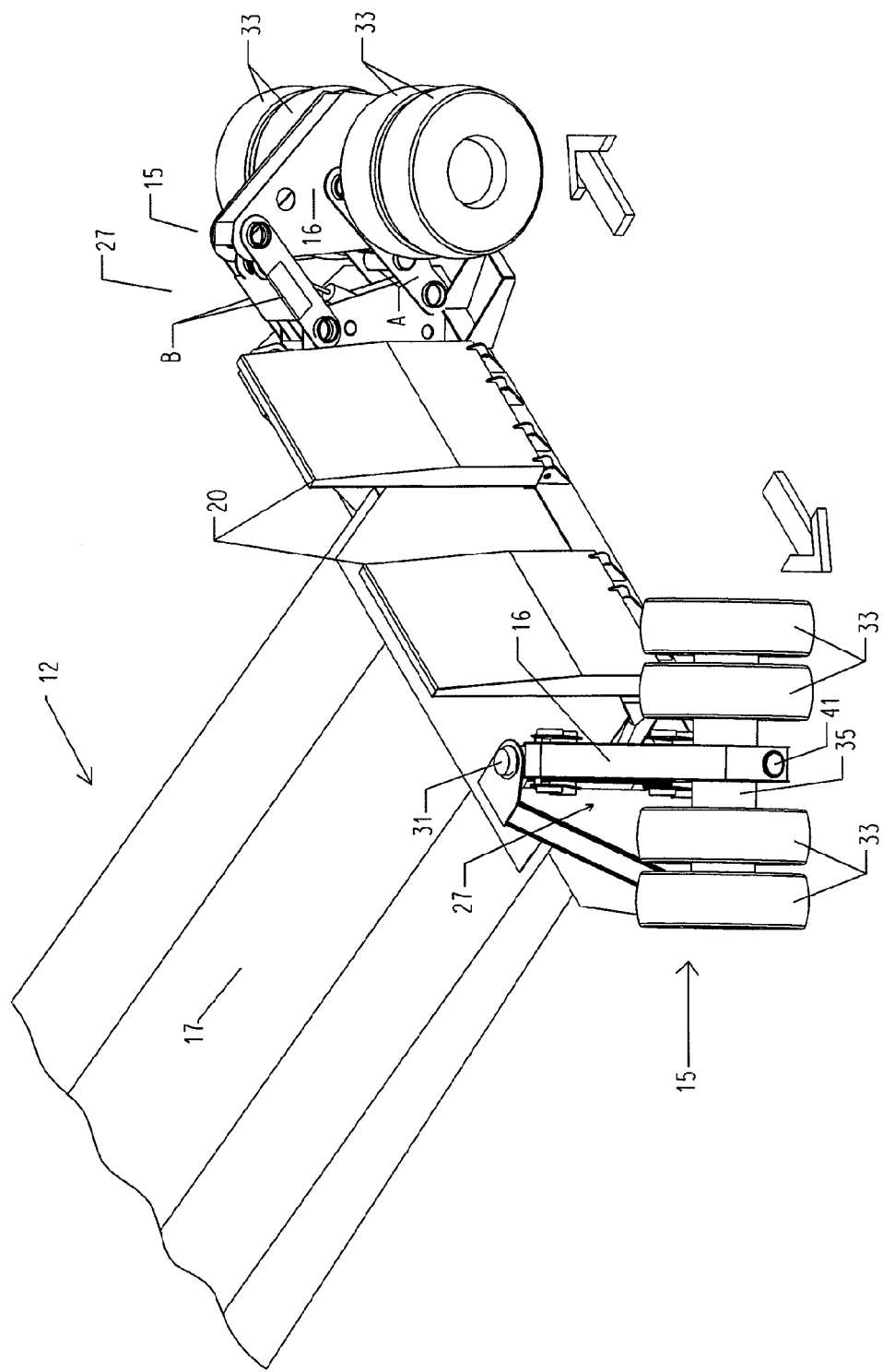
Figure 8A:
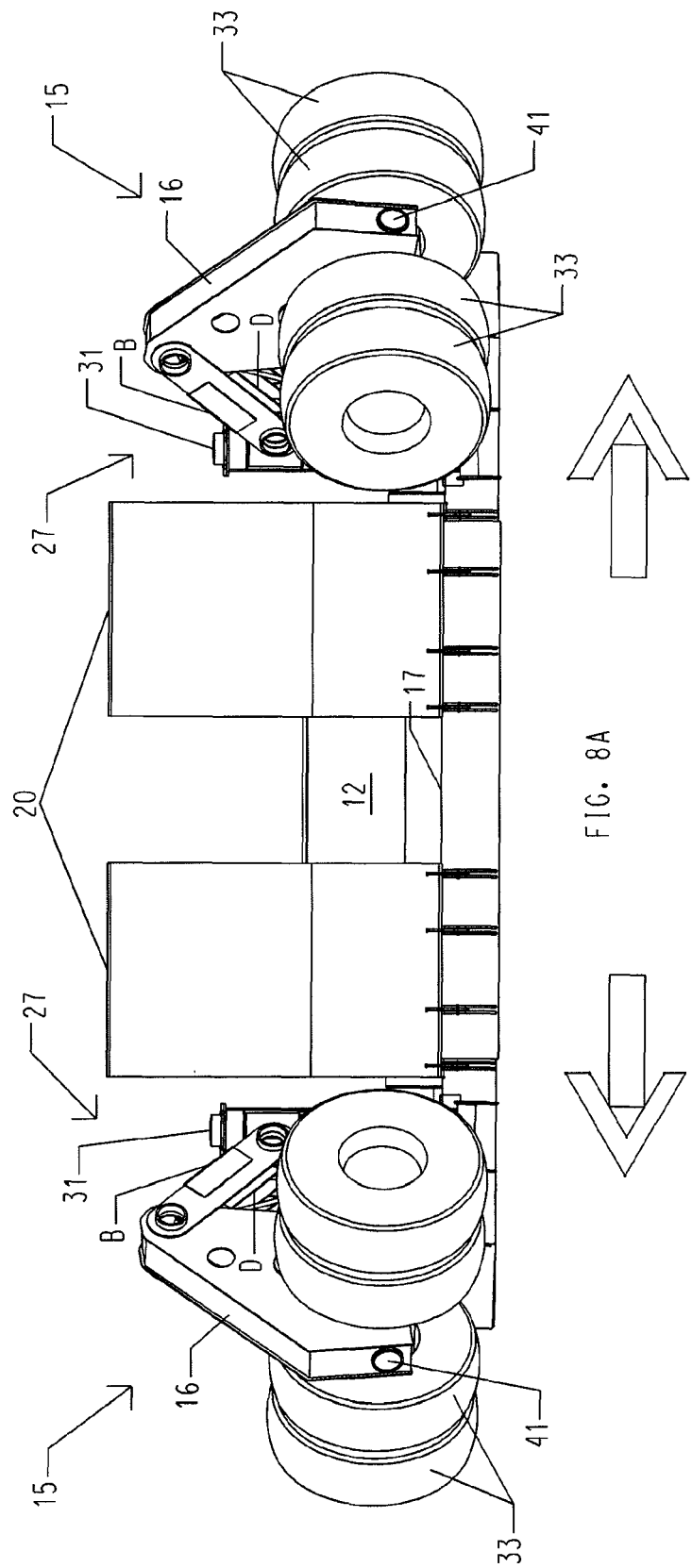
FIG. 8A illustrates the trailer in the same position as illustrated in FIG. 8, except viewed from the rear of the trailer chassis in order to more clearly see the lowered rear end of the trailer chassis so as to allow loading and unloading of equipment carried by the trailer positions.
Figure 8B:
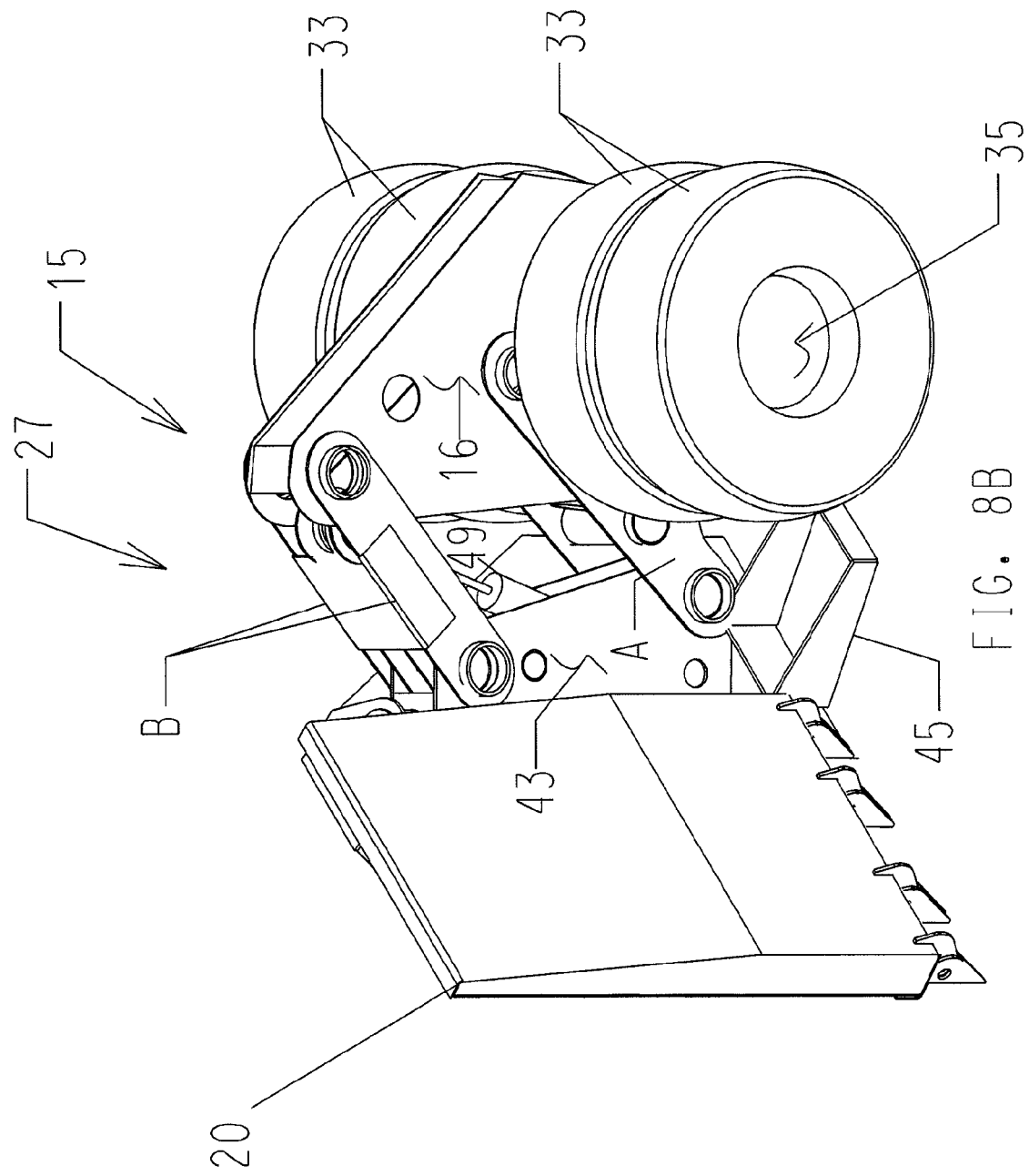
FIG. 8B is an enlarged and partial view of the trailer illustrated in FIG. 8A, showing the docking pocket on the passenger's side of the trailer chassis.
Figure 9:
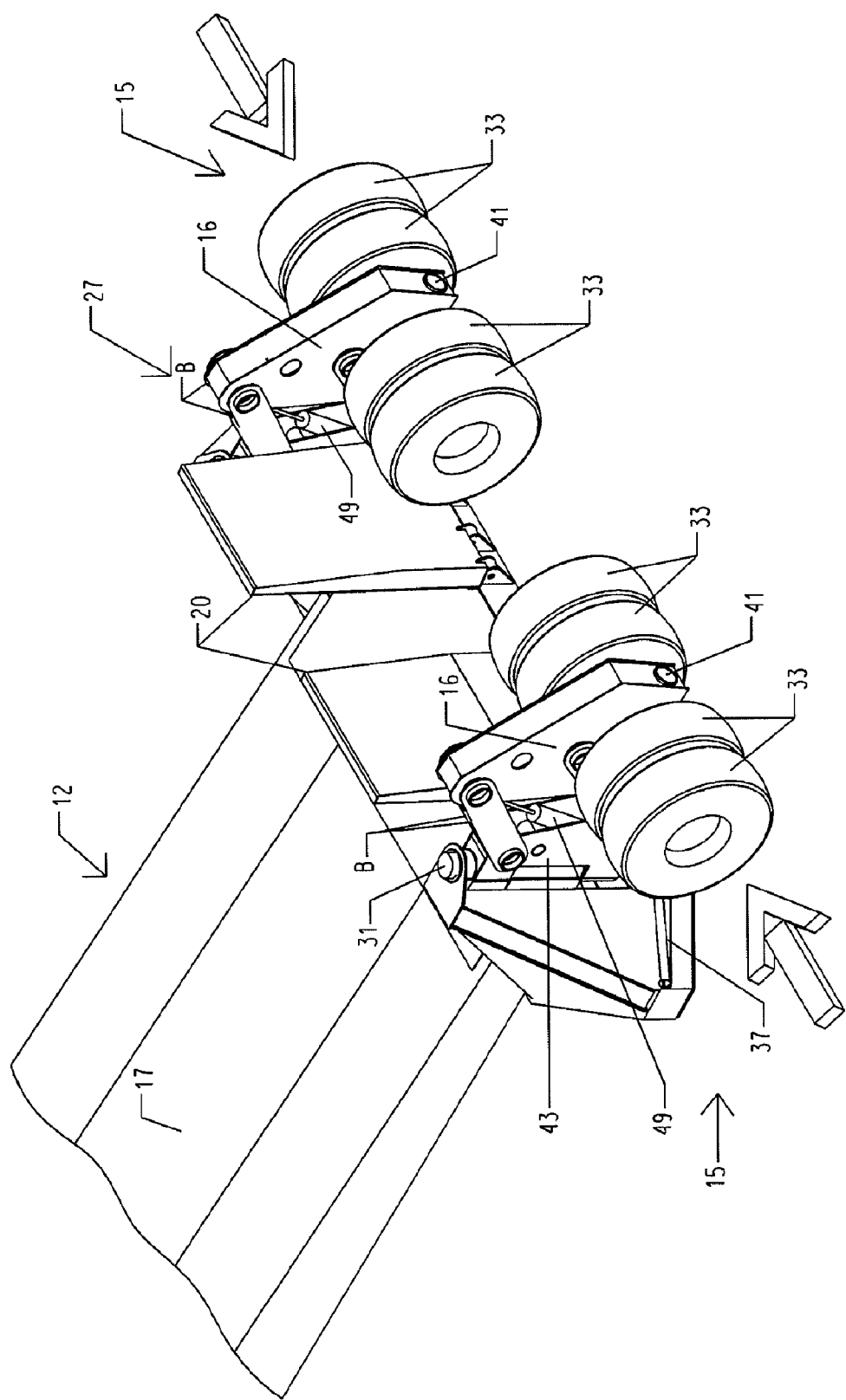
Figure 10:
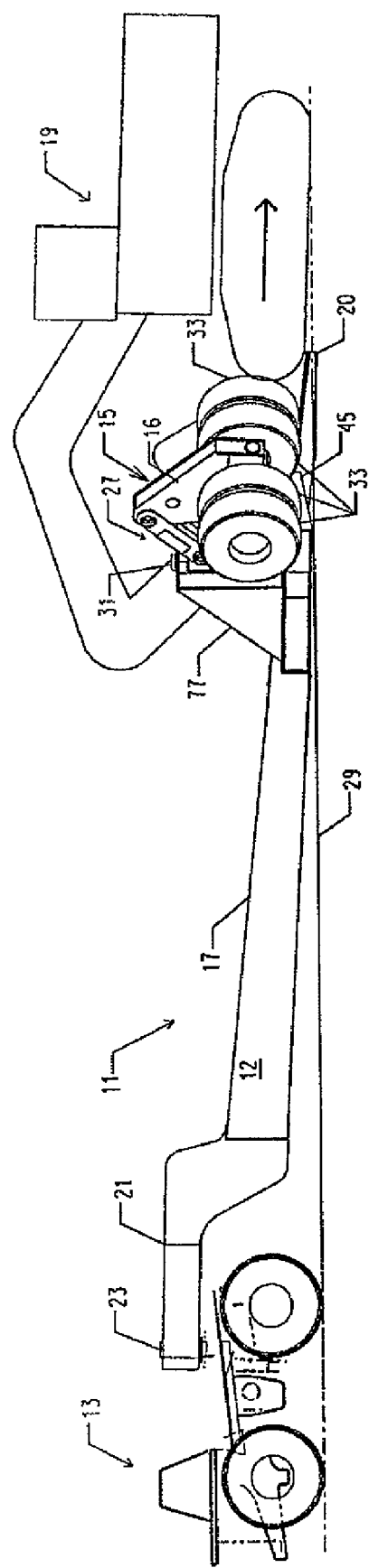

FIGS. 1A through 1O showed the sequence of transitioning the trailer 11 between transport and load positions in a side or profile view of the trailer 11. Referring to FIGS. 6-10, the sequence of movements of the axle wheel assemblies 15 and the trailer chassis 12 transitioning the trailer 11 between its transport and loading positions is illustrated from a perspective view of the trailer 11. When each of the axle wheel assemblies 15 is in its transport position as illustrated in FIG. 6, the axle wheel assembly 15 is locked to the trailer chassis 12 such that it cannot move laterally or slew outwardly as the trailer 11 moves. However, simply raising the axle wheel assemblies 15 in order to lower the rear of the trailer chassis 12 to the ground surface 29 as shown in FIG. 7 unlocks the axle wheel assemblies 15 and frees them to rotate about the vertical pivot 31. No operator intervention is required. Once unlocked, the axle wheel assemblies 15 are able to move outwardly in order to clear the rear of the trailer chassis 12 for loading or unloading as illustrated in FIGS. 8 and 8a. The hydraulic cylinder 37 (best seen in FIG. 5) controls the movement of each of the axle wheel assemblies 15 outwardly and inwardly. FIG. 8b is an isolated view of the structure of the pivot 31 that comprises a hinge assembly 43 for joining ends of the linkage comprising the linkage mechanism 27 to the trailer chassis 12.

As explained in greater detail hereinafter, the linkage mechanism 27 consists of 1) link "A" lower main link with a tab 47, 2) link "B" upper main link, 3) link "C" lower strong-arm or deadman link, and 4) link "D" upper strong-arm or deadman link. FIG. 8b also shows a pocket 45 attached to the trailer chassis 12 that receives a tab 47 (see FIGS. 1J and 12) extending from link A of the linkage mechanism 27 when the axle wheel assembly 15 is lowered into its transport position. Engagement of the tab 47 of the link A with the trailer chassis pocket 45 locks each of the axle wheel assemblies 15 in line with the trailer chassis 12 and prevents the assembly from wandering back and forth to and from its transport position during movement of the trailer 11. In this regard, after loading or unloading the trailer 11, the axle wheel assemblies 15 are brought back to their raised, in-line position in FIG. 9, which positions the axle wheel assemblies to be lowered to their transport position in FIG. 10. When the hydraulic cylinder 37 of each axle wheel assembly 15 has moved the raised axle wheel assembly fully inwardly in line with the trailer chassis 12, the tab 47 of the link A is in line and above the trailer chassis pocket 45 for being received by the pocket when another hydraulic cylinder 49 lowers the raised axle wheel assembly 15 to its transport position shown in FIG. 10.

Both of the hydraulic cylinders 37, which control the lateral rotating movement of the axle wheel assemblies 15 when they are in the raised position, and the hydraulic cylinders 49, which raise and lower the axle wheel assemblies, are preferably controlled from the tractor 13 so the tractor-trailer operator can transition the trailer 11 between transport and loading positions without leaving the driver's seat of the tractor 13. However, a dual or second set of hydraulic controls (not shown) can be mounted on the trailer chassis 12. Each of the hydraulic cylinders may have its own manually actuated control so that the operator can control the timing and sequence of the movements driven by the hydraulic cylinders 37, 49 and 59. Of course, the hydraulic control system (not shown) for the hydraulic cylinders 37, 49 and 59 may provide for an automatic sequencing of the cylinder activations. In any event, the details of the control system are conventional and are not further discussed herein.

Figure 11A:
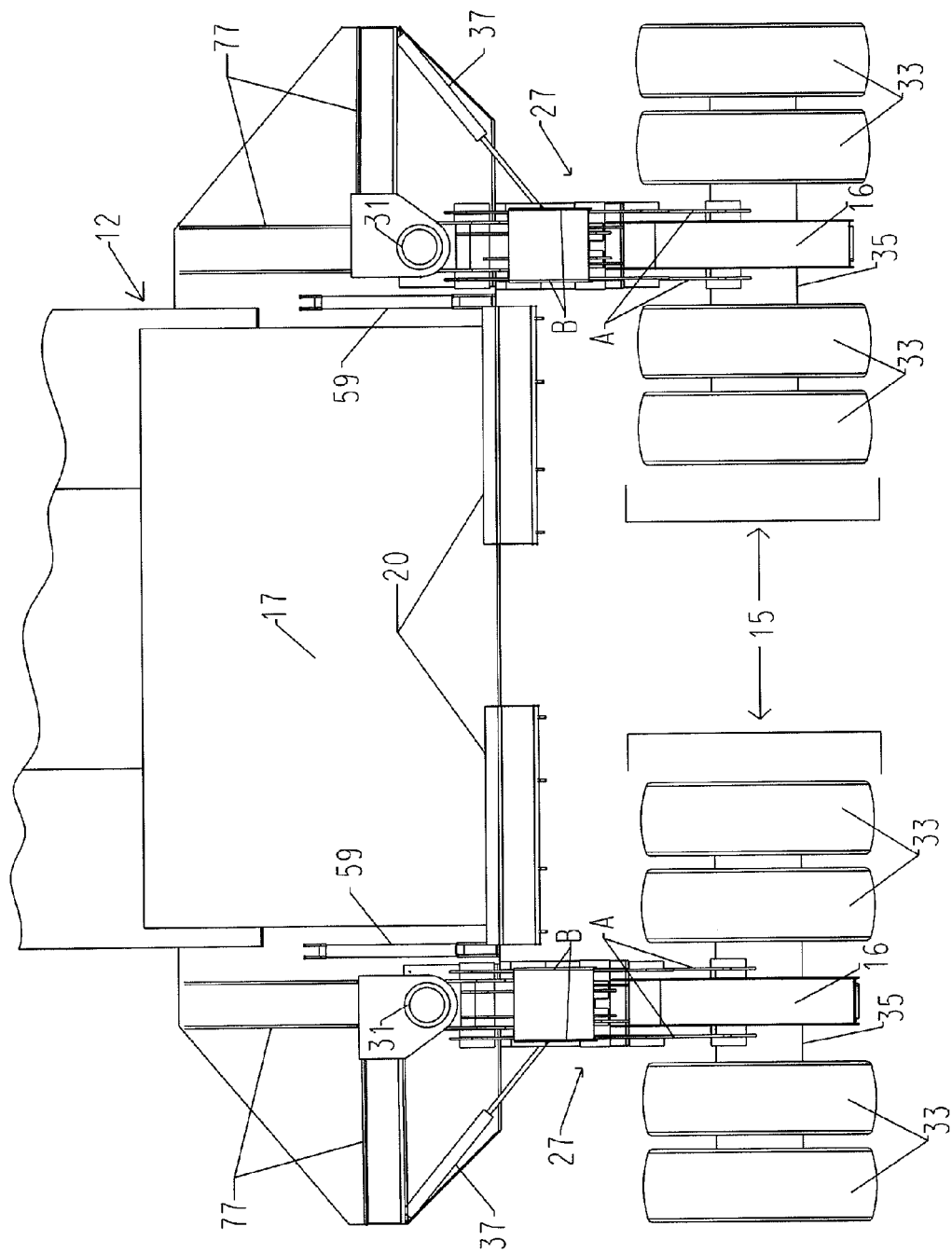
FIGS. 11A and 11B are overhead views of the rear portion of the trailer, including the axle wheel assemblies and illustrating the axle wheel assemblies in their transport (FIG. 11A) and raised (FIG. 11B) positions, respectively.
Figure 11B:
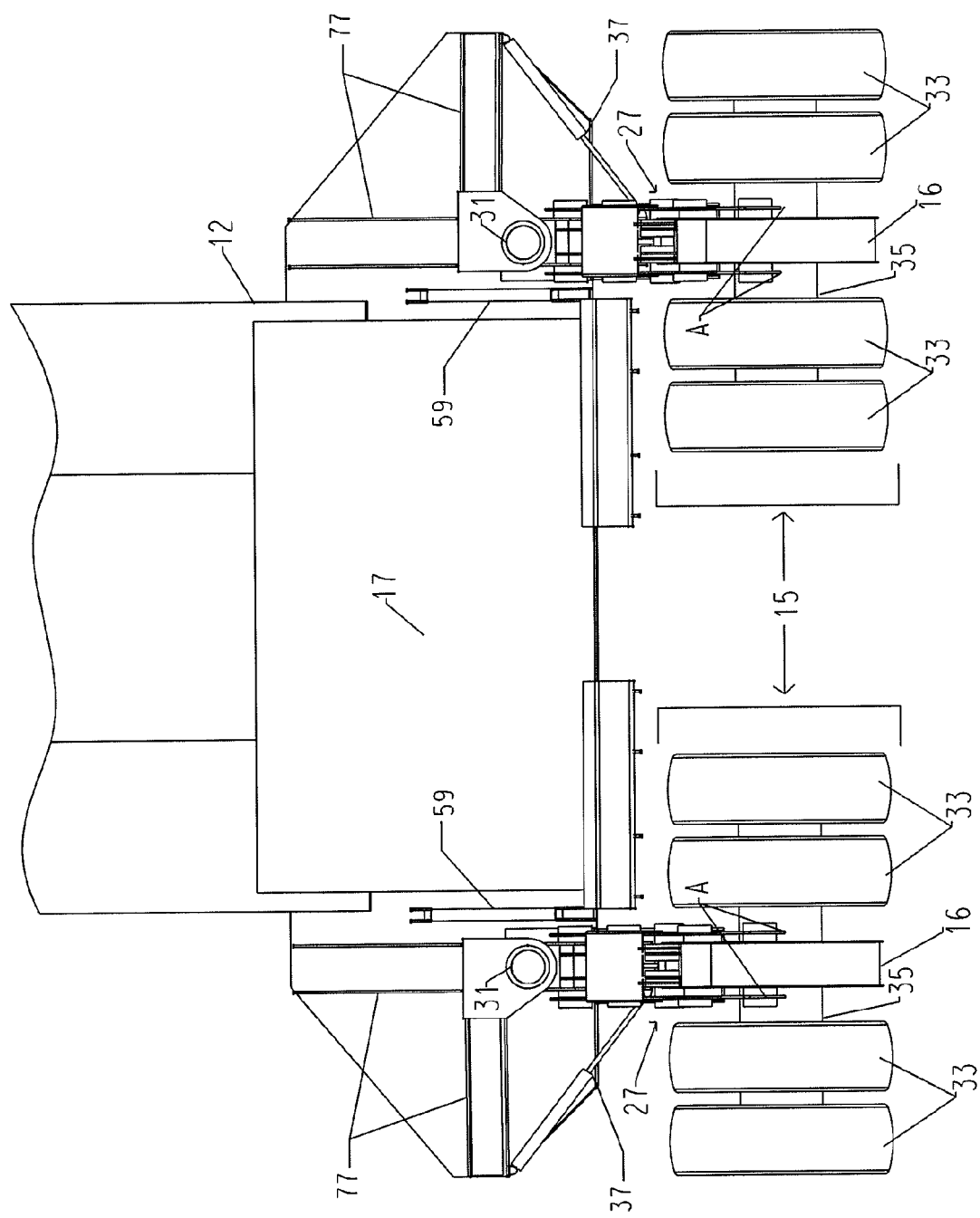

The hydraulic cylinders 49 raise and lower the axle wheel assemblies 15 as illustrated in the top view of the rear of the trailer chassis 12 in FIGS. 11a and 11b. The axle wheel assemblies 15 move up and down around pivot pins 51 and 53 of the hinge assembly 43 (see FIG. 8b) that join links of the linkage mechanism 27 to the hinge assembly 43. Raising the axle wheel assemblies 15 is not a completely linear motion, so the axle wheel assemblies 15 are rotated inwardly slightly when they are raised as shown in FIG. 11b such that the forward edges of the wheel and tire pairs 33 may overhang the rear of the trailer chassis 12.

Figure 12:
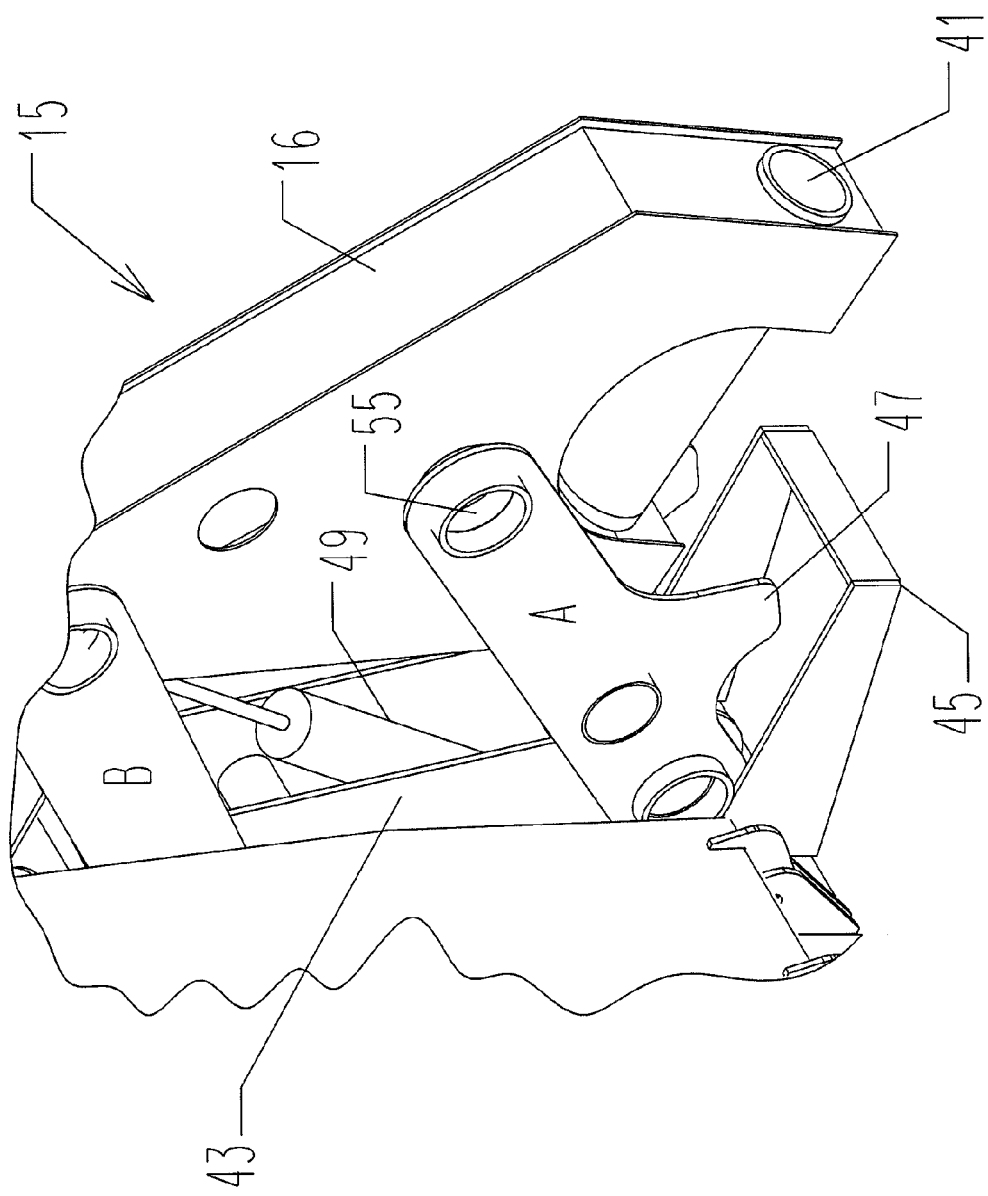
FIG. 12 is a close-up view of a portion of the linkage mechanism of the axle wheel assembly on the passenger's side of the trailer chassis (some parts removed for clarity), illustrating the docking pocket for the locking tab on one arm of the linkage mechanism. With the docking pocket on the trailer chassis set to fasten the axle wheel assembly linkage mechanism in its transport position when lowered, the axle wheel assemblies are prevented from wandering or walking laterally.

Referring to FIG. 12 for detail of the trailer chassis pocket 45 that provides the automatic axle wheel assembly 15 locking function, the trailer chassis pocket 45 associated with each of the wheel assemblies 15 is an angular bracket attached to the trailer chassis 12 and forming a trailer chassis pocket 45 or opening for receiving the tab 47 of the link A of the linkage mechanism 27. The trailer chassis pocket 45 is not intended to transfer weight between the axle wheel assembly 15 and the trailer chassis 12. Rather the trailer chassis pocket 45 fastens the linkage mechanism 27 to the trailer chassis 12 by interacting with tab 47. When the tab 47 of link A is received by the trailer chassis pocket 45, the linkage mechanism 27 and the associated axle wheel assembly 15 is locked in place so as to prevent the linkage mechanism and the associated axle wheel assembly from drifting or wandering sideways from its position in line with the trailer chassis 12.

With the wheel and tire pairs 33 and the wheel and tire axle 35 removed from the axle wheel assembly 15 in FIG. 12, a pivot 55 can be seen, which secures link A of the linkage mechanism 27 to the carrier frame 16 of the axle wheel assembly 15. The pivot 55 supports rotation of the link A at the carrier frame 16. Also, FIG. 12 shows more completely the pivot 41 that supports the axle 35 and enables the axle to oscillate as illustrated in FIG. 4.

Referring to FIGS. 13-17, both of the axle wheel assemblies 15 are shown with their pairs of wheels and tires 33 and wheel and tire axles 35 removed to better illustrate the links A, B, C and D comprising the linkage mechanism 27 and their movement between the loading and transport positions of the trailer 11. As previously mentioned but more easily seen in FIGS. 13-17, each of the axle wheel assemblies 15 includes a carrier frame 16 for supporting the pivot 41, the wheel and tire axle 35 and connecting pivots for ends of the links A, B and C of the linkage mechanism 27. Each of the linkage mechanisms 27 connects the carrier frame 16 to the hinge assembly 43, which pivots laterally about the trailer chassis 12. The links A, B, C and D comprising each of the linkage mechanisms 27 are paired such that each link secured to one side of the carrier frame 16 and one side of the hinge assembly 43 is complemented by another link secured directly to the opposing sides of the carrier frame 16 and the hinge assembly 43. Thus, for each linkage mechanism 27, there is a pair of links A, a pair of links B, a pair of links C and a pair of links D. In this regard, unless indicated otherwise, the discussion herein of a link is intended to include both links in a pair. In addition to being mounted by pivots to each of the carrier frame 16 and the hinge assembly 43, the hinge assembly 43 carries the links, and therefore also the axle wheel assemblies 15, for rotation about axes defined by the pivots 31.

A stabilizing band 75 joins the pair of links B in each of the linkage mechanisms 27. The hydraulic cylinder 37 is attached to the hinge assembly 43 at one end of the hydraulic cylinder and to a hinge brace 77 on the trailer chassis 12 at the other end. Each of the hinge braces 77 defines a reference for pulling or pushing the hinge assembly 43 by the hydraulic cylinder 37 so as to cause the lateral rotation of the associated wheel assembly 15 about the pivot 31 of the hinge assembly 43. The hinge brace 77 includes a plate 77a that caps off the hinge brace 77.

Figure 13:
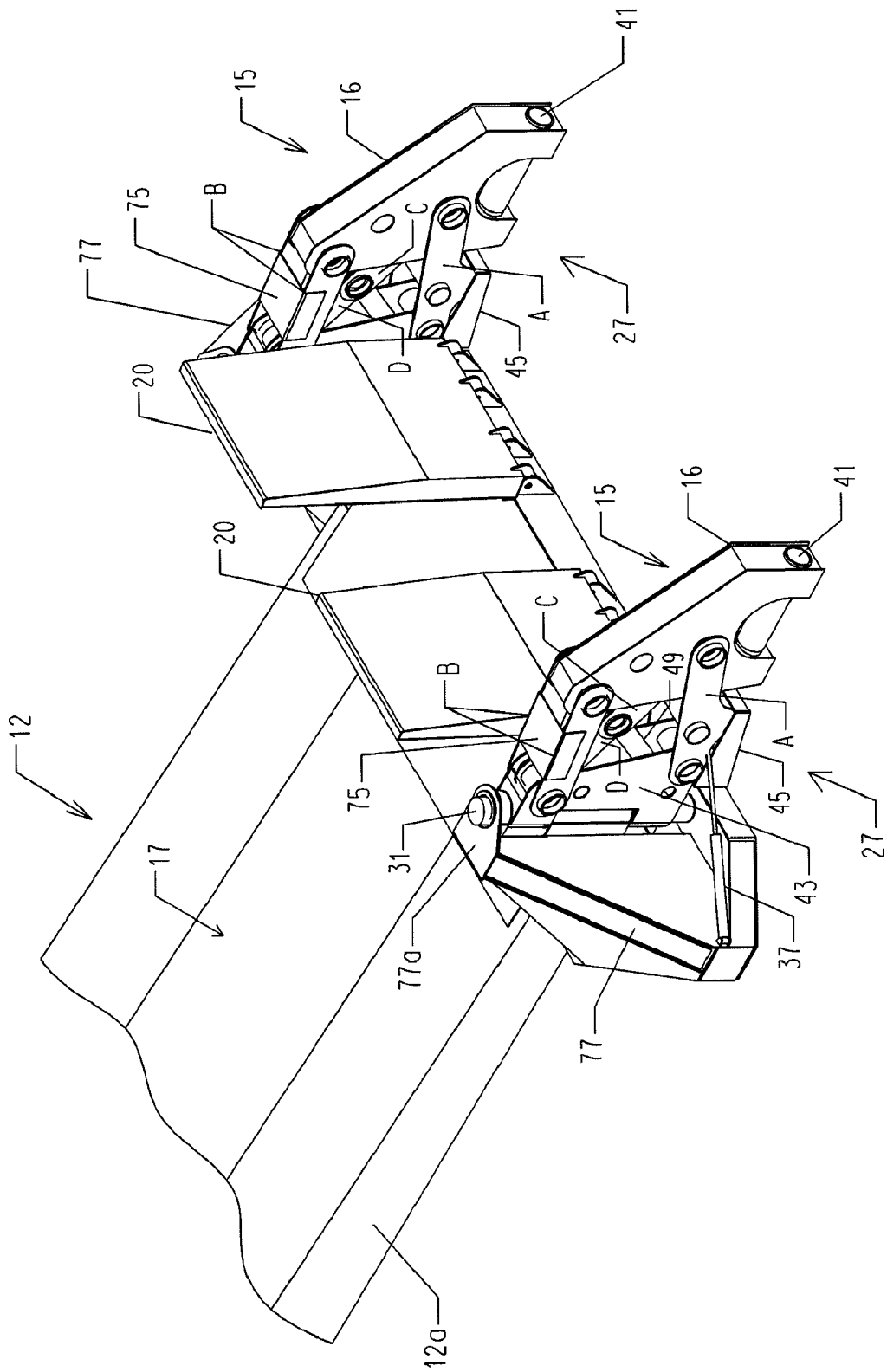

In the position of the linkage mechanism 27 shown in FIG. 13, the axle wheel assembly 15 is in the transport position. The links C and D of each of the linkage mechanisms 27 are in alignment and the weight of the trailer chassis 12 and its load transfers to the ground surface 29 through the links A, B, C and D, the pivot 41, wheel and tire axle 35 and the pairs of wheels and tires 33.

As explained more fully hereinafter in connection with FIGS. 18-20 and 22, breaking the alignment of the links C and D in each of the linkage mechanisms 27 allows the linkage mechanism 27 to raise the axle wheel assembly 15 to a position shown in FIG. 14. By raising the axle wheel assemblies 15, the rear of the trailer chassis 12 is lowered to the ground surface 29. The linkage mechanisms 27 lift the axle wheel assemblies high enough to clear the lowest point of the tires of the wheel and tire pairs 33 above the lower part of the rear of the trailer chassis 12, thereby assuring the rear of the trailer chassis 12 goes to the ground surface 29 and the weight of the trailer chassis 12 and its load is freed from the links A, B, C and D, the pivot 41, the wheel and tire axle 35 and the wheel and tire pairs 33 of each of the linkage mechanisms 27.

Figure 15A:
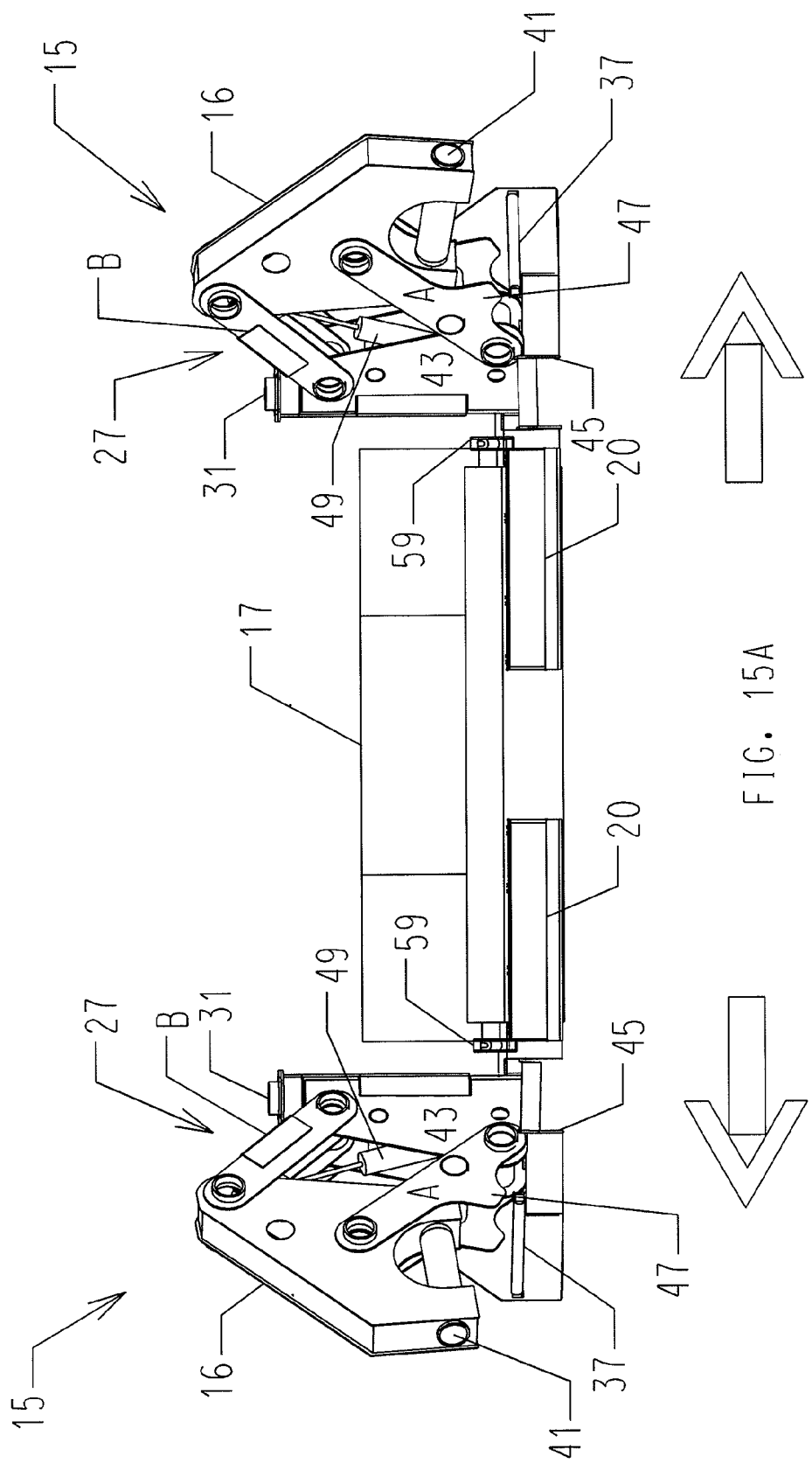
FIG. 15A illustrates the raised axle wheel assemblies rotating outwardly as shown in FIG. 15 except viewed from the rear of the trailer.

Once free of the ground surface 29 and all weight of the trailer chassis 12 and its load, the axle wheel assemblies 15 with linkage mechanisms 27 can easily be skewed or rotated outwardly by retracting the hydraulic cylinders 37. In this regard, the tab 47 of the link A of each of the linkage mechanisms 27 is free of the pocket 45 when the axle wheel assembly 15 is in its raised position. The arc of rotation of the axle wheel assemblies 15 in FIG. 15 is sufficient to ensure the innermost wheel and tire pair 33 of each of the wheel and tire assemblies 33 approximately clears the associated side 12a of the trailer chassis 12. After the axle wheel assemblies 15 have cleared the rear of the trailer chassis 12, the ramp 20 is lowered by a third hydraulic cylinder 59.

Each of the cylinders 37, 49 and 59 is a prime mover for causing and controlling the movements of the ramp 20, linkage mechanisms 27 and axle wheel assemblies 15. Other types of prime movers could be used such as screw drives driven by electric motors, pneumatic power or internal combustion engines.

Figure 16:
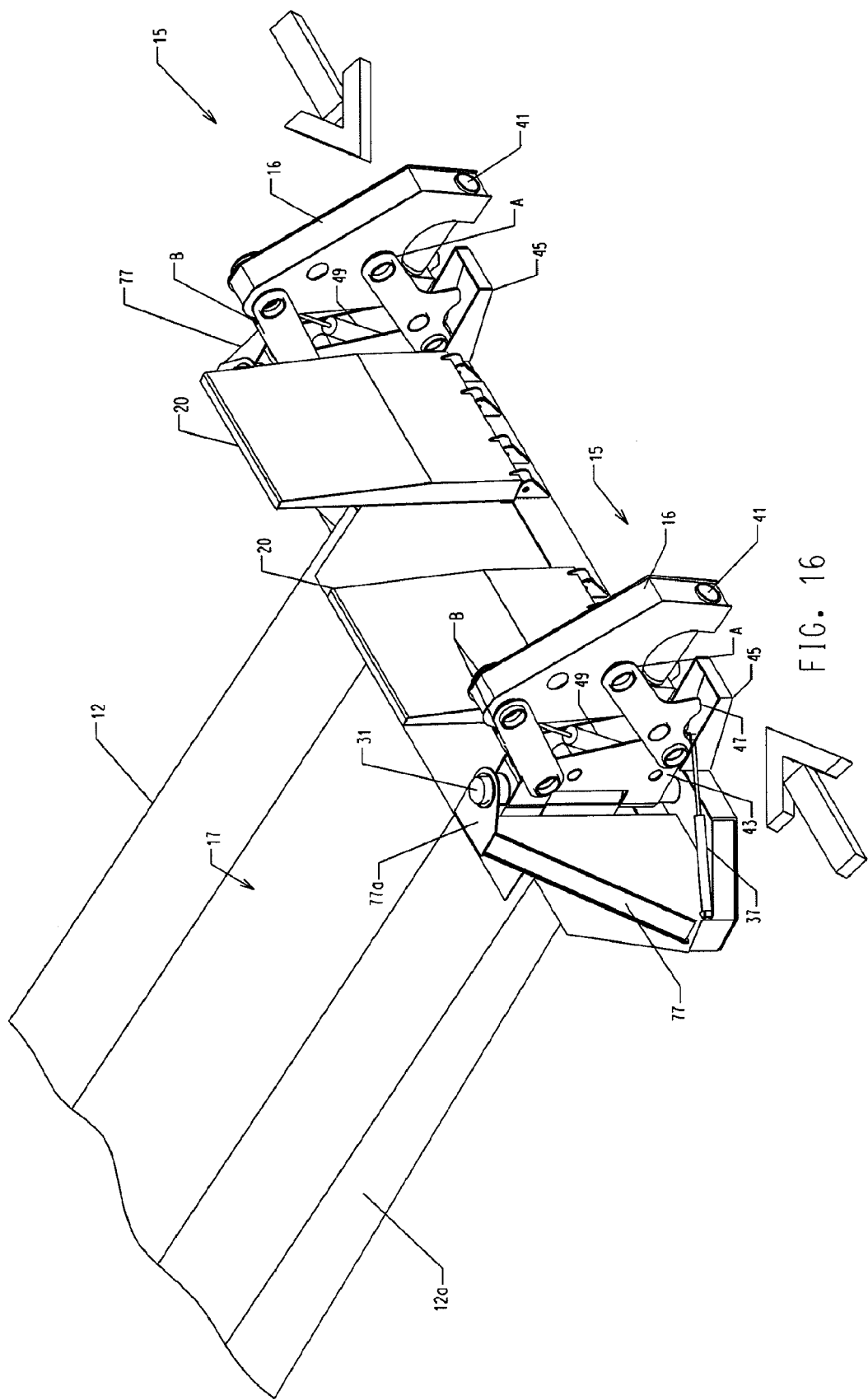

After a load has been either loaded onto the trailer chassis 12 or unloaded from the trailer chassis 12, the ramp 20 is raised back to the vertical transport position as shown in FIG. 16 and the axle wheel assemblies 15 are rotated back inwardly to the same raised position they occupied in FIG. 13 by extending the cylinders 37.

Figure 17:
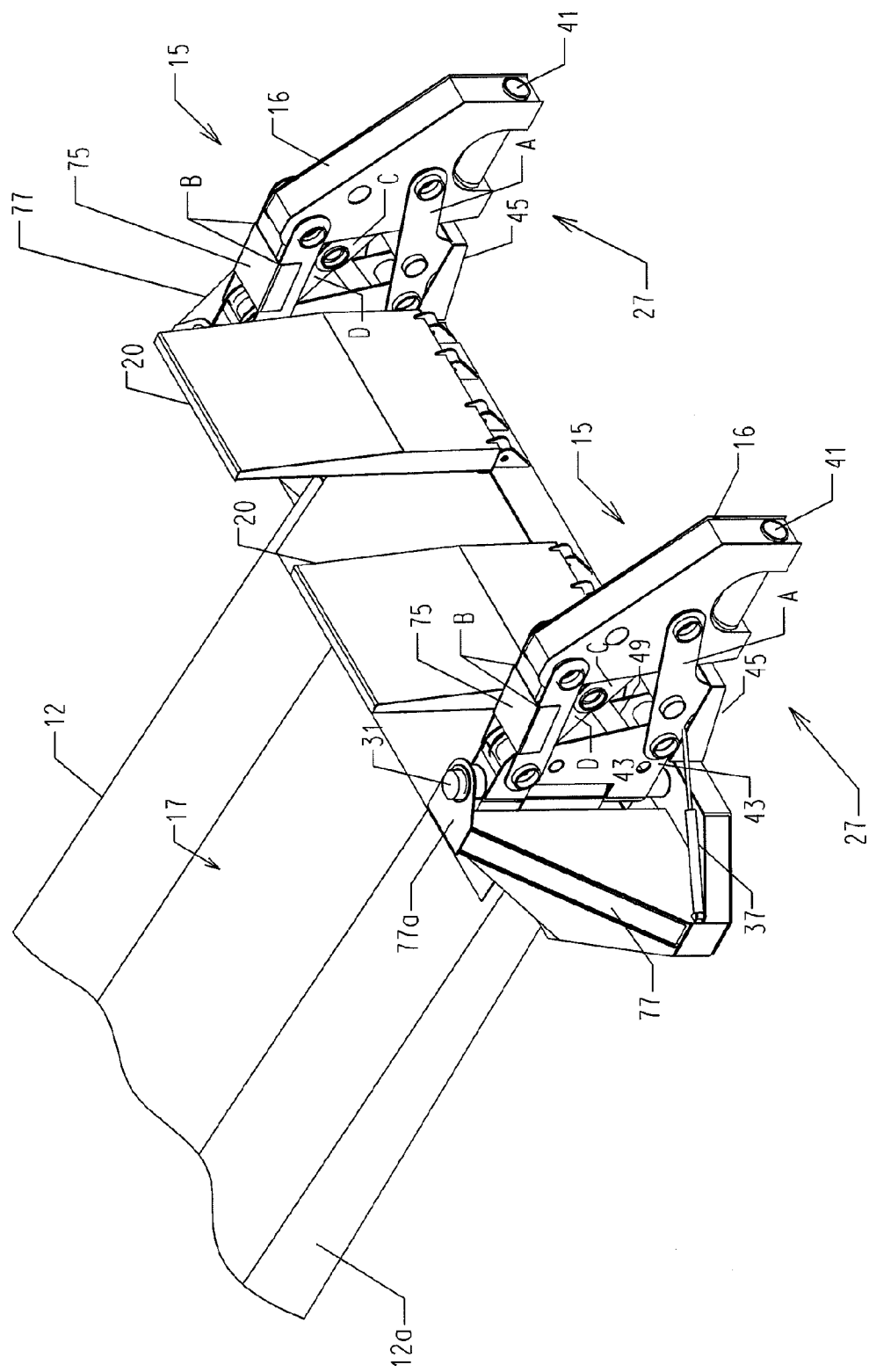

To return the axle wheel assemblies 15 to the transport position, the hydraulic cylinders 49 retract starting from the position of the linkage mechanisms 27 and the axle wheel assemblies in FIG. 16. Retracting the hydraulic cylinders 49 pulls the links C and D back into alignment, which brings the axle wheel assemblies 15 down. As the axle wheel assemblies 15 are lowered, the weight of the trailer chassis 12 and any load it is carrying transfers from the rear of the trailer chassis 12 to the wheel and tire pairs 33 and to the intermediate parts such as the wheel and tire axles 35, the pivots 41 and the linkage mechanisms 27. By the end of its stroke the hydraulic cylinder 49 has moved the links C and D of each of the linkage mechanisms 27 into alignment as illustrated in FIG. 17 and all of the weight of the trailer chassis 12 and any load it carries is supported by the axle wheel assemblies 15.

Figure 22:
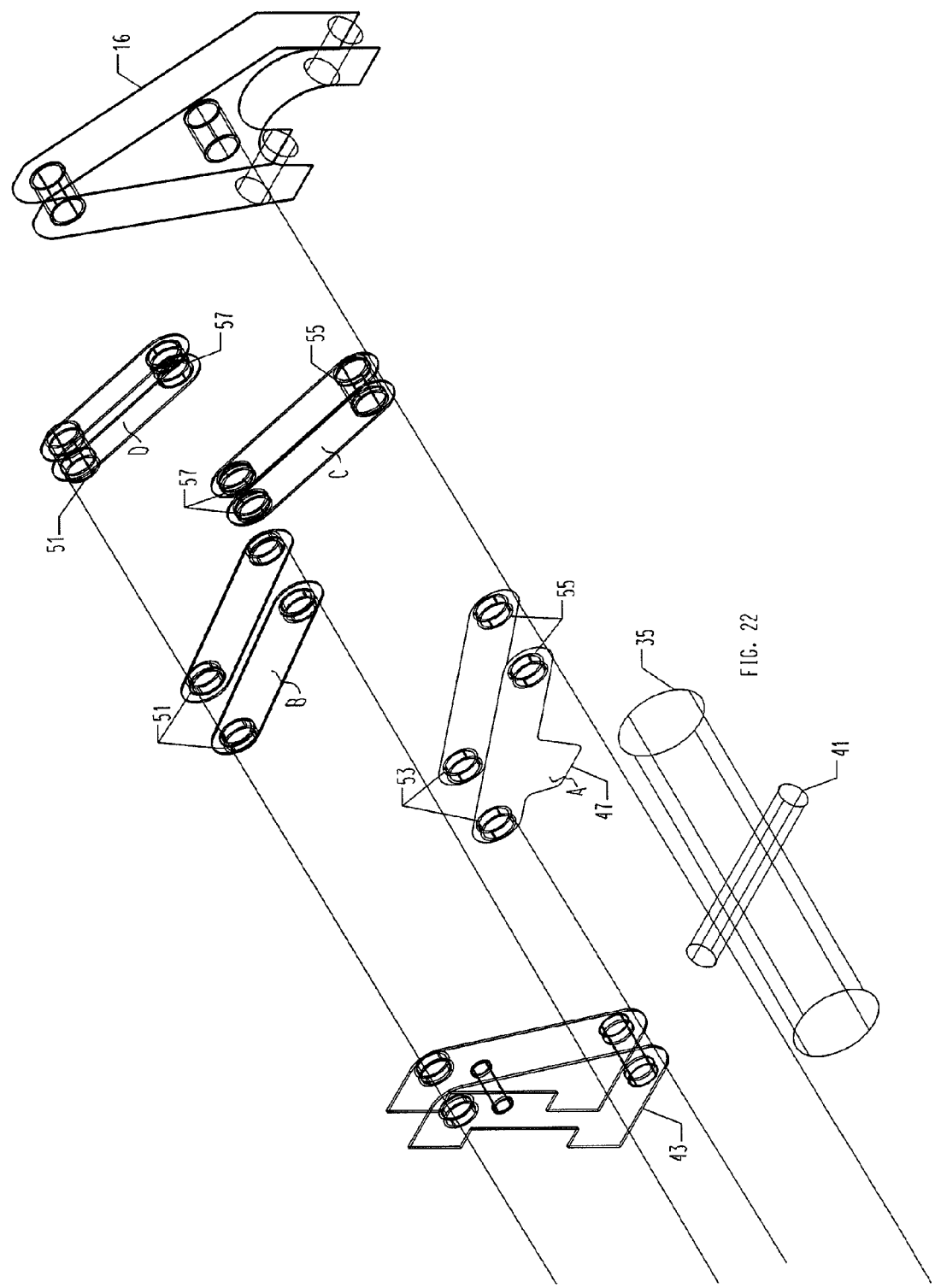
FIG. 22 illustrates an exploded view of the links comprising the linkage assembly illustrated in FIGS. 18-20.

Referring to FIGS. 18-22, one of the linkage mechanisms 27 is illustrated in profile in FIGS. 18-20a to assist in describing how the links A, B, C and D comprising the linkage mechanism 27 interact as the axle wheel assembly 15 is moved between its lowered or trailer 11 raised transport position and the raised position or trailer 11 loading position that lowers the rear of the trailer chassis 12. FIG. 22 illustrates an exploded view of one of the linkage mechanisms 27 to assist in better understanding the relationships among the component links A, B, C and D. FIG. 21 illustrates an isolated view of the lowered trailer chassis 12 and the ramp 20 with the axle wheel assemblies 15 removed in order to better show the relative inclinations and single planar surface between the ramp 20 and the deck 17 of the trailer chassis 12.

The linkage mechanism 27 comprises links A, B, C and D. The hydraulic cylinder 49 is connected to a pivot 57 joining links C and D. Pivots 53 and 51 for links A and B, respectively, are connected to the hinge assembly 43. The linkage mechanism 27 in FIGS. 18-20a moves between a down or transport position for the axle wheel assembly 15 (FIGS. 18 and 20) and an up or raised axle wheel assembly 15 position (FIGS. 19 and 20a). The hydraulic cylinder 49 is the prime mover for causing the linkage mechanism 27 to transition each of the axle wheel assemblies 15 between the transport and raised positions. In the raised position of the axle wheel assembly 15 shown in FIGS. 19 and 20a, the trailer chassis 12 is in its lowered position for loading. In this regard, the deck 17 of the trailer chassis 12 illustrated in FIG. 20a is angled as illustrated in order to facilitate loading of heavy loads such as the off-highway excavator 19 when the linkage mechanism 27 lowers the trailer 11.

Referring to FIG. 21, in its lowered position, the rear of the trailer 11 is supported on the ground surface 29. The inclined deck 17 of the trailer ends at a ramp 20 hinged to the rear of the trailer 11. The incline of the ramp 20 substantially matches in a linear plane that of the inclined deck 17. When in its loading position as illustrated in FIG. 21, the ramp 20 allows the heavy load to be moved onto the trailer without crossing over a transition apex area between the deck 17 and the ramp 20, thereby avoiding a loading teeter totter effect that undesirably concentrates the load and causes the load to rock down onto the deck 17 after the load's center of gravity passes over the transition apex.

Figure 18:
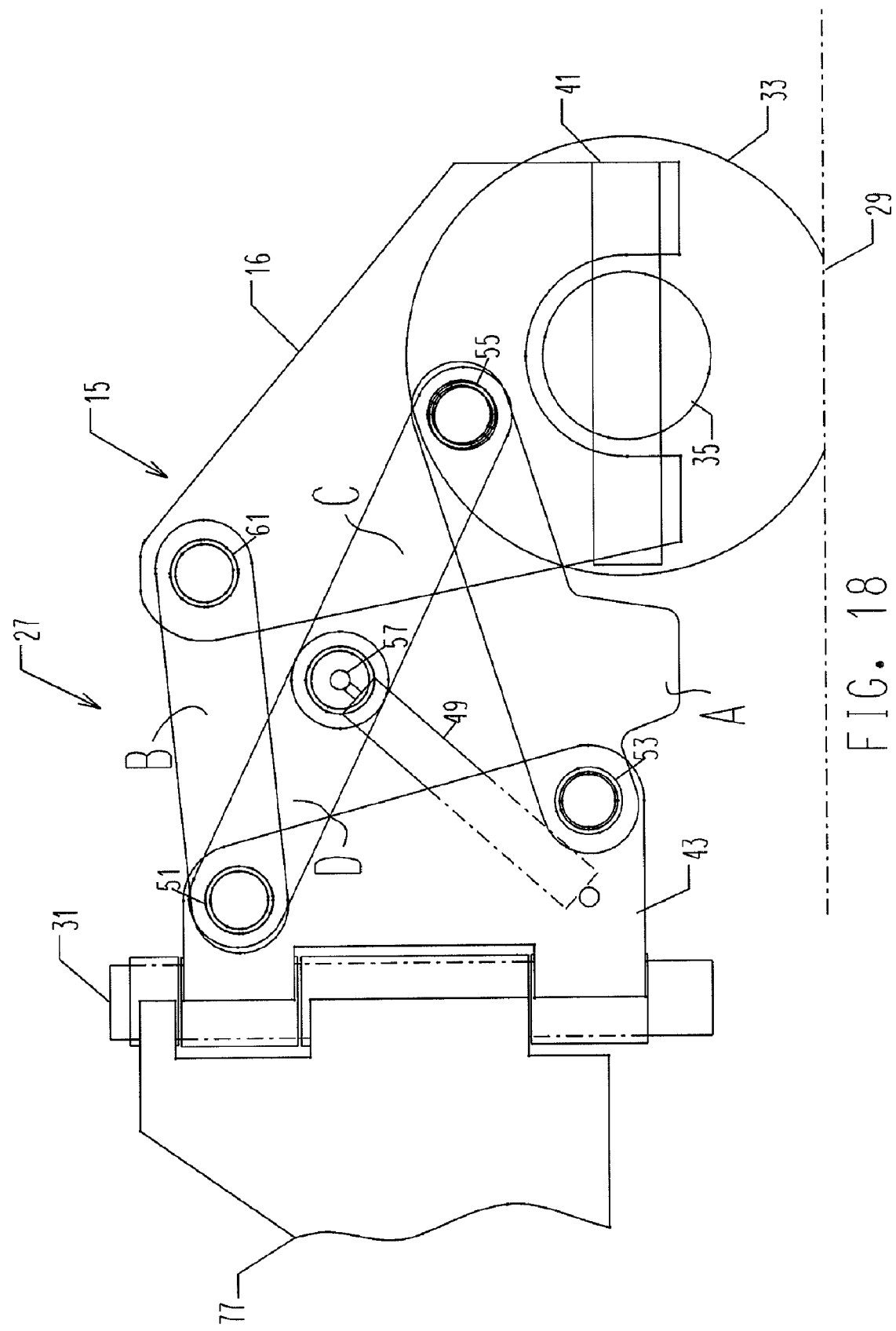
FIGS. 18-20 are side-views, schematic representations of the linkage mechanism for the axle wheel assembly on the driver's side of the trailer.
Figure 19:
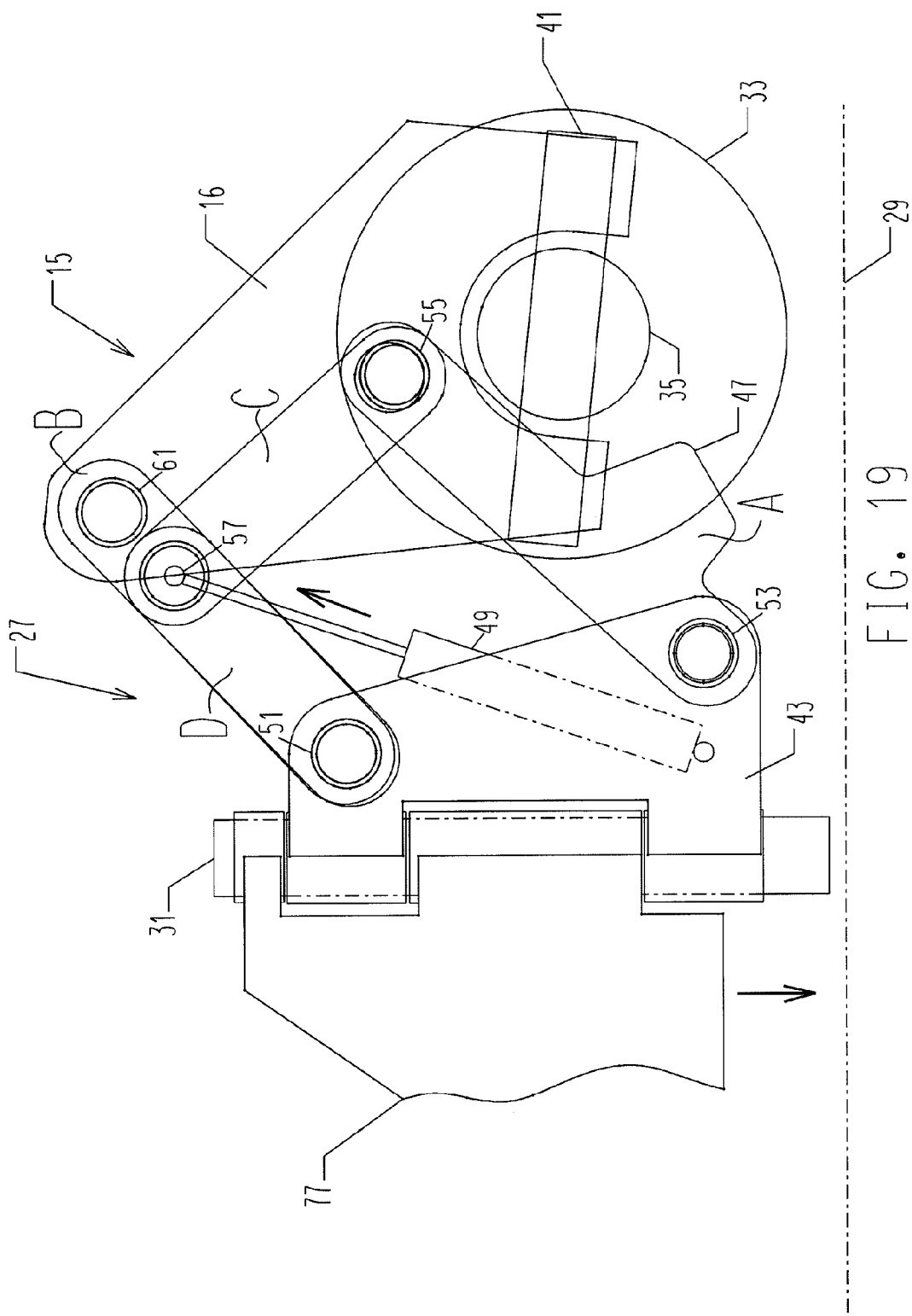
Figure 20:
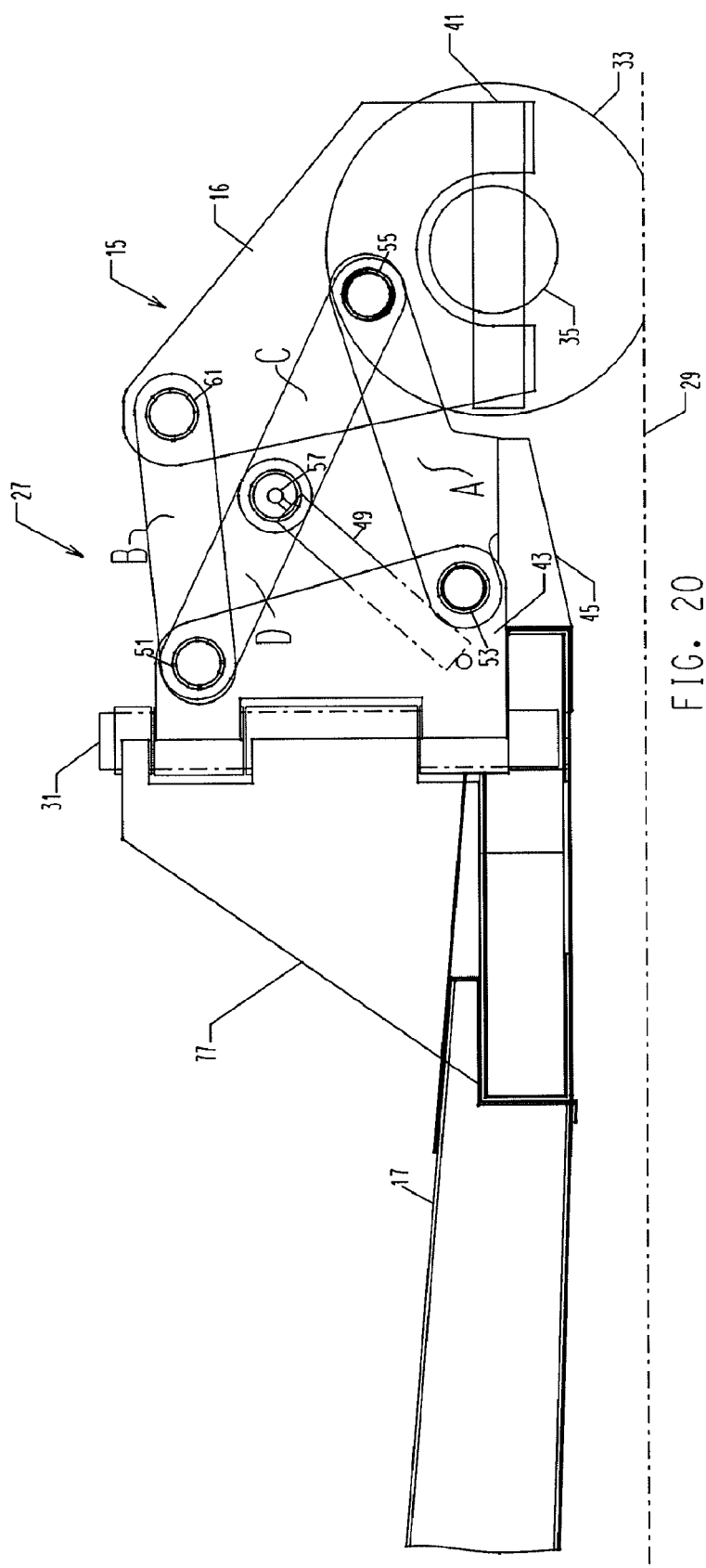
Figure 20A:
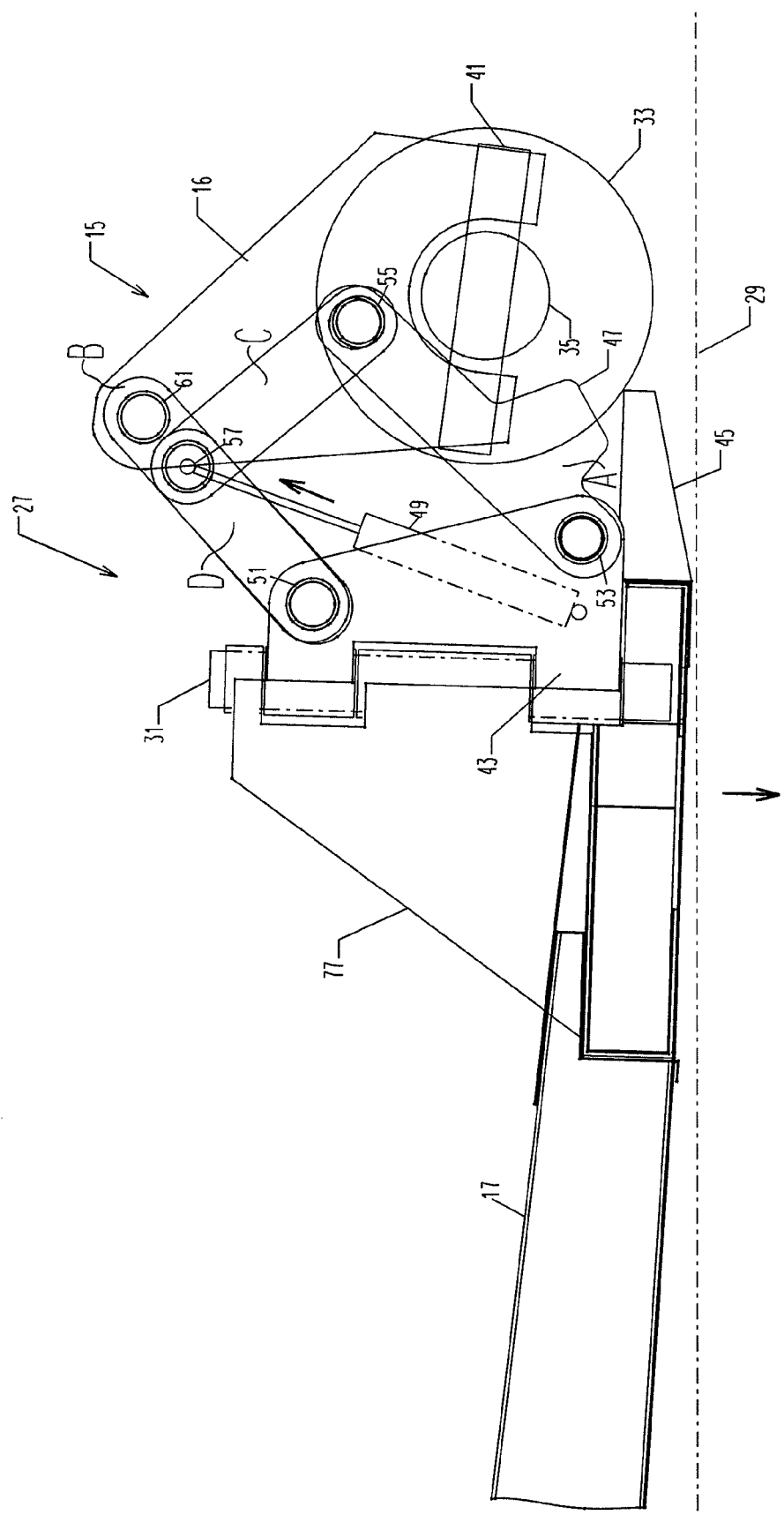
FIG. 20a illustrates a side view of the rear of the trailer chassis incorporating the axle wheel assembly of FIGS. 18-19, with the linkage mechanism of the axle wheel assembly in the position illustrated in FIG. 19 (i.e., axle up relative to the trailer deck).

In the axle down position of FIGS. 18 and 20, the trailer 11 is in its raised transport position as best shown in FIG. 20. To move the trailer 11 to its lowered position, the hydraulic cylinder 49 is extended in order to break the linear "locked-up" or "deadman" arrangement of links C and D as illustrated in FIGS. 18 and 20. Extension of the hydraulic cylinder 49 moves the pivot 57 joining the links C and D upwardly. As the pivot 57 moves upwardly, the hinge assembly 43 pivots 53 and 51 are lowered relative to the pivots 55 and 61, which are fixed to the axle carrier frame 16 of the axle wheel assembly 15. When the hydraulic cylinder 49 is fully extended as illustrated in FIG. 19 and FIG. 20a, the rear of the trailer 11 is on the ground surface 29 and supporting the weight of the trailer 11 as illustrated in FIG. 21, while the wheel and tire pairs 33 are free of the trailer's weight.

To return the trailer 11 to its up position as illustrated in FIG. 20, the hydraulic cylinder 49 is retracted, starting from the position of the linkage mechanism 27 illustrated in FIG. 19 and FIG. 20a. As the hydraulic cylinder 49 retracts, the pivot 57 is lowered with respect to the hinge assembly 43 pivots 53 and 51 of the links A and B, respectively, that are fixed to the hinge assembly 43 and the pivots 55 and 61 that are fixed to the axle carrier frame 16. As the pivot 57 is lowered, the weight of the trailer 11 is transferred from the rear of the trailer 11 to the axle wheel assemblies 15 through the links A, B, C and D and the hydraulic cylinder 49. As the pivot 57 of the links C and D moves into a linear straight line arrangement, less of a load is assumed by the hydraulic cylinder 49. Finally, with the links C and D aligned in a straight line, the hydraulic cylinder 49 is not supporting any load of the trailer 11. Instead, the hydraulic cylinder 49 provides a stabilizing force to maintain the links C and D in straight line alignment.

Figure 20B:
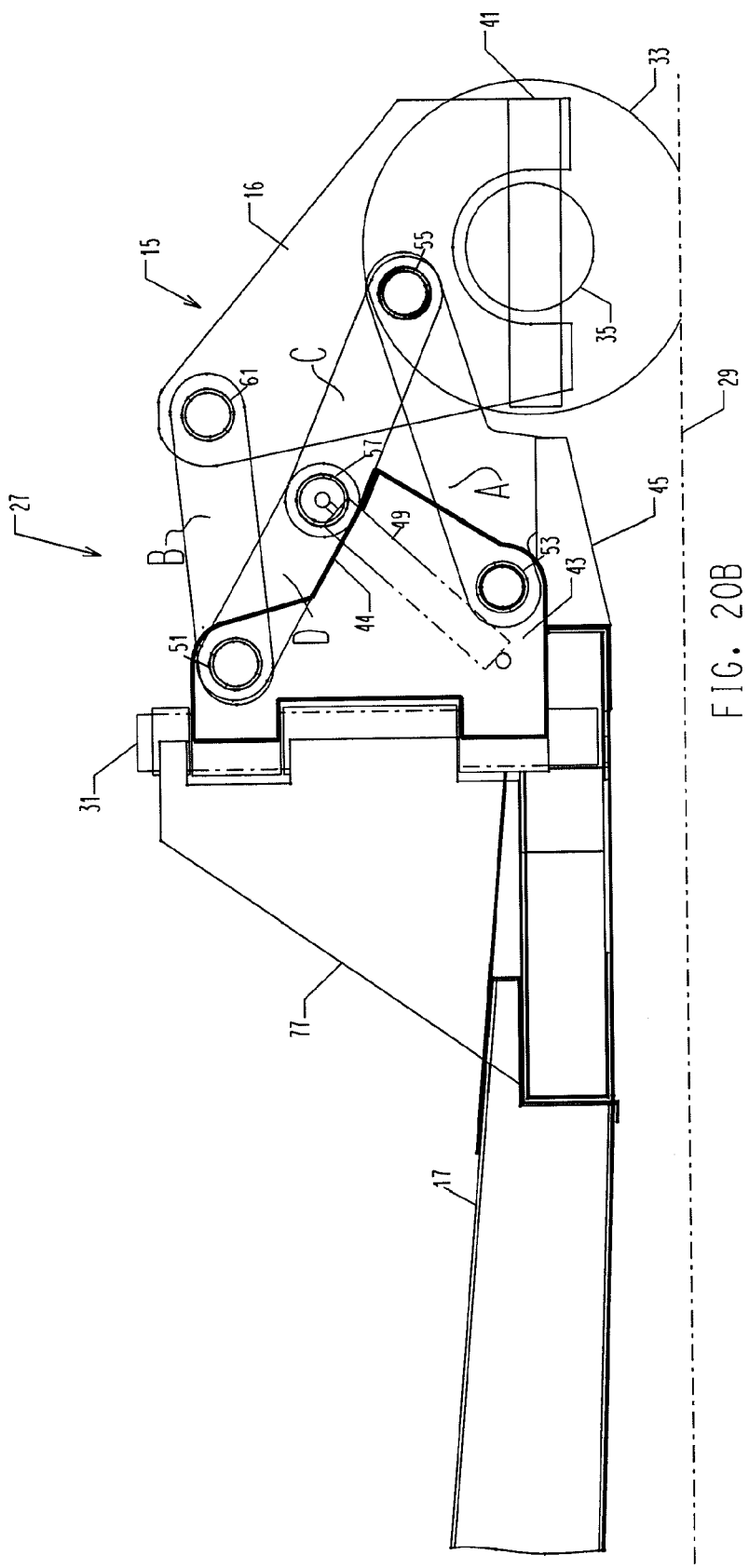
FIG. 20b illustrates a side view of the rear of the trailer chassis incorporating the axle wheel assembly of FIGS. 18-19, with the linkage mechanism of the axle wheel assembly in the position illustrated in FIG. 18 (i.e., axle down relative to the trailer deck). And with the linkage mechanism of the axle wheel assembly supported in a slightly down over center position by a fixed mechanical link.

In one embodiment of the linkage of FIGS. 18 and 20, the hydraulic cylinder 49 may retract to move the pivot 57 past the center line of the aligned links C and D to a position supported by the fully collapsed hydraulic cylinder 49 or on a mechanical stop 44 best shown in FIG. 20b. The mechanical stop 44 is simply a metal extension of the hinge assembly 43 that is otherwise the same as the hinge assembly illustrated and described herein before. The links C and D are moved down past alignment with their center line joining their pivot points at the carrier 16 and the hinge assembly 43 so that they begin to collapse in the opposite direction. The stop 44 prevents further downward movement beyond that defined by the stop's physical position that interrupts the path the links C and D would take if allowed to continue to rotate about the pivot 57. The hydraulic cylinder 49 itself can serve as the stop by allowing the links C and D to move over center and stop only when the hydraulic cylinder 49 has fully collapsed its piston. Either way, ordinary bouncing and jolting of the linkage mechanism 27 as the trailer 11 moves on a roadway is unlikely to impart any weight of the trailer 11 to the fluid of the hydraulic cylinder 49 that might otherwise occur if the hydraulic cylinder 49 is not collapsed and holding the links C and D in exact straight linear alignment.

Referring to FIGS. 18 and 20, aligned links C and D form one side of a triangle. The other two sides are formed by link A and the hinge assembly 43 pivots 53 and 51 of the axle wheel assembly 15 as best seen in FIG. 20. The three-point support formed by this triangle provides a support for the pivot 55. Another triangle is formed by the aligned links C and D, the link B and the carrier frame 16. These two triangles in combination rigidly support the carrier frame 16 carrying the wheel and tire axle 35 of the axle wheel assembly 15. As long as the links C and D are aligned, these two triangles complete the rigid support between the carrier frame 16 and hinge assembly 43 of the axle wheel assembly 15. Link B provides little weight support serving primarily as a carrier frame 16 stabilizer.

FIG. 22 shows an exploded view of the linkage mechanism 27 to more easily understand the relationship of the links A, B, C and D in three dimensions.

Figure 23:
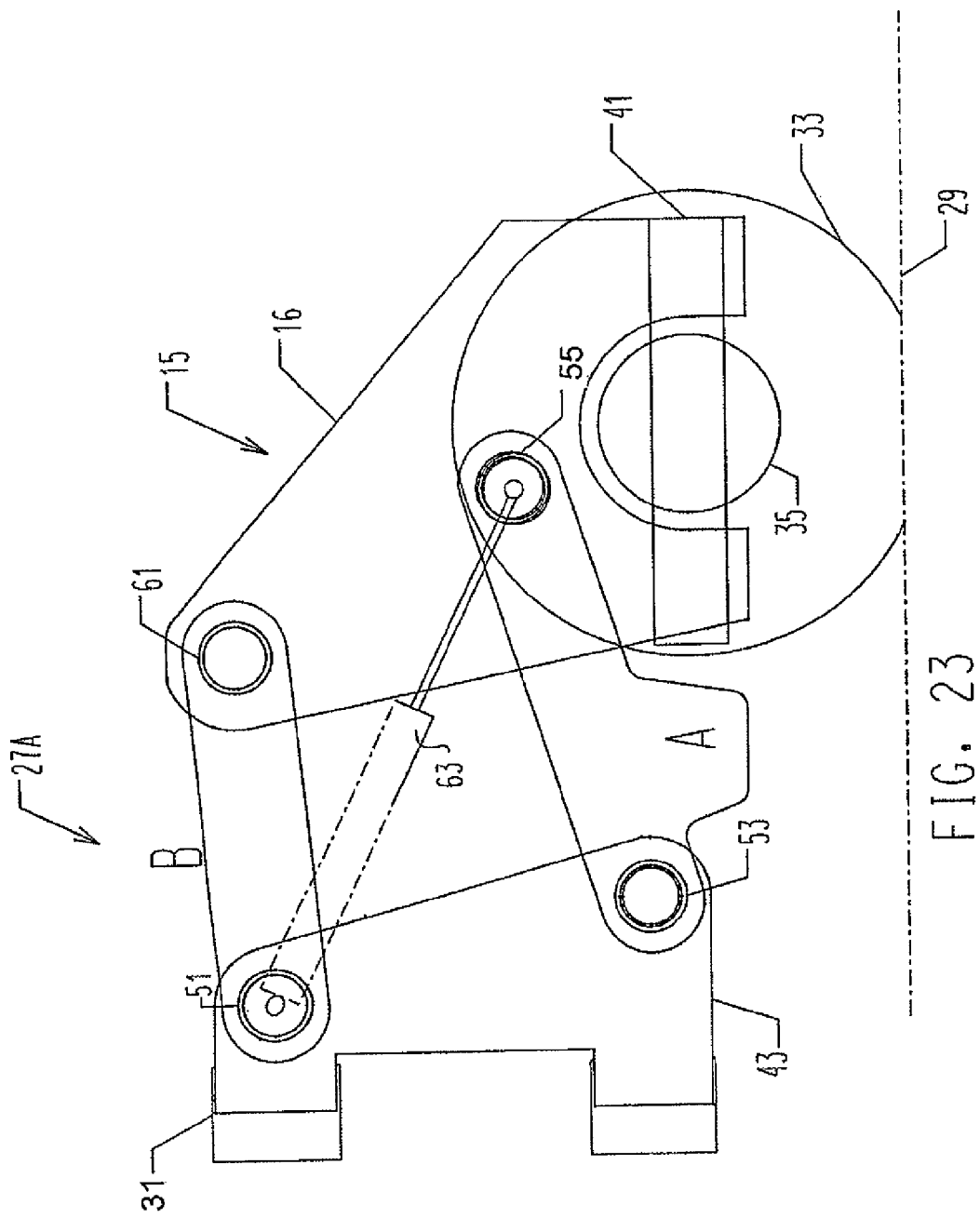
FIGS. 23-25 are side-views, schematic representations of the linkage mechanism for the axle wheel assembly on the driver's side of the trailer according to an alternative embodiment.
Figure 24:
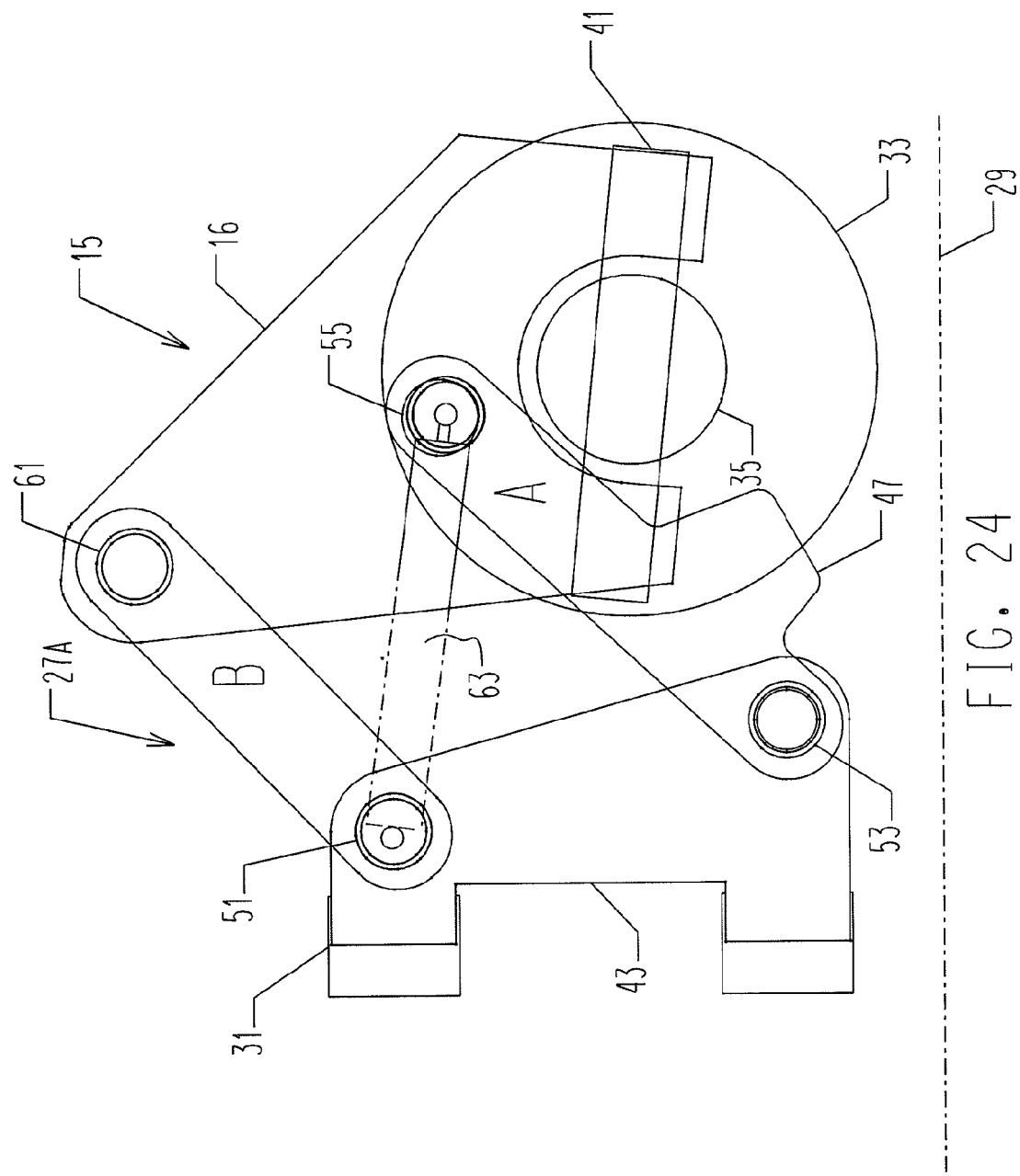
Figure 25:
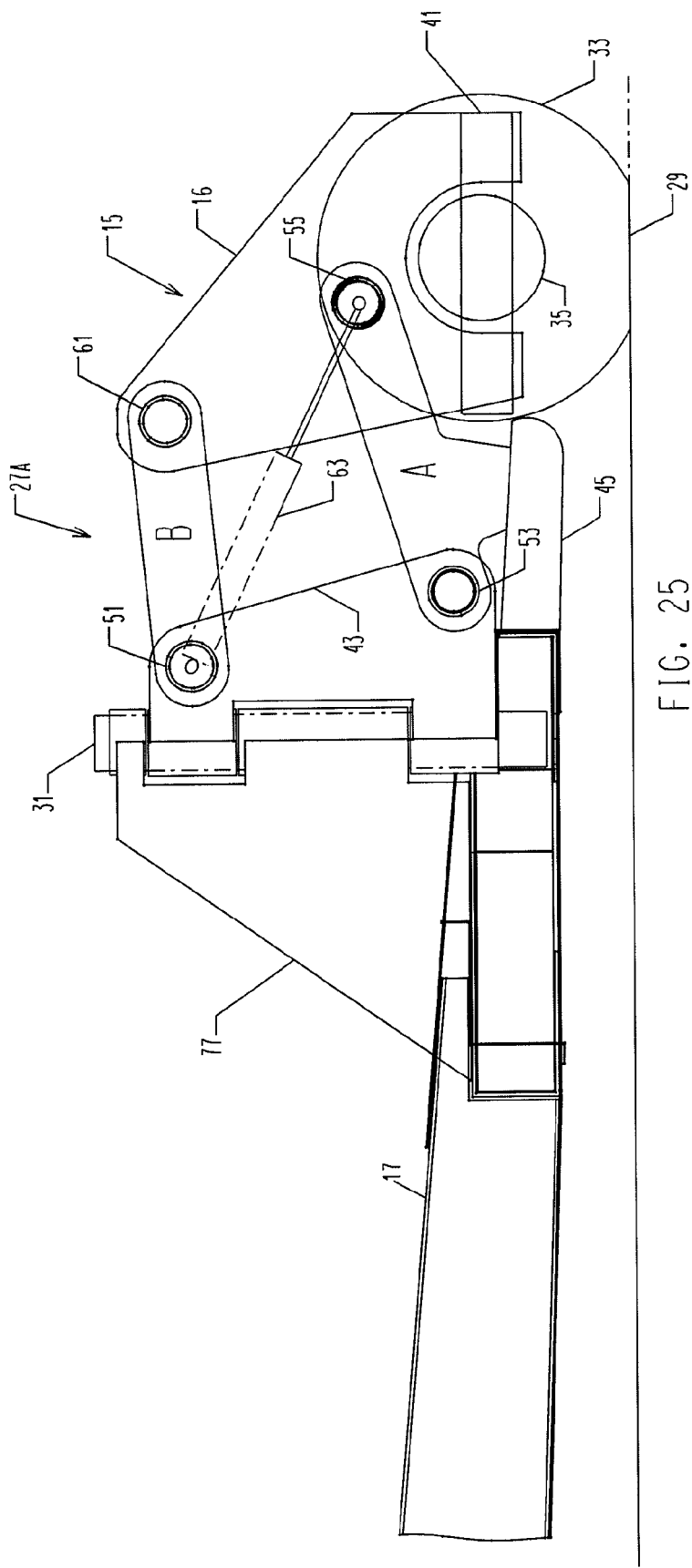

FIGS. 23-25 illustrate an alternative embodiment of the linkage mechanism in which the links C and D of the first embodiment of the linkage mechanism 27 in FIGS. 1-22 are replaced by a hydraulic cylinder 63 and the hydraulic cylinder 49 in FIGS. 1-22 is eliminated. In this embodiment of the axle wheel assembly 15, the linkage mechanism 27a in FIGS. 23-25 swings the axle wheel assembly 15 upwardly and inwardly in the same manner as described for the axle wheel assembly 15 and linkage mechanism 27 illustrated in FIGS. 1-22. As suggested by a comparison of the linkage mechanism 27 of FIGS. 18-20 and the linkage mechanism 27a of FIGS. 23-25, the fundamental difference between the first and second embodiments of the linkage mechanisms 27 and 27a is that the links C and D of the first embodiment are replaced in the second embodiment by a hydraulic cylinder 63. Otherwise, the two embodiments of the linkage mechanisms share links A and B and the other structures described in detail in connection with the first embodiment of FIGS. 1-22, which, therefore, will not be repeated for this description of the second embodiment of the linkage mechanism 27a illustrated in FIGS. 23-25.

In the transport position of the axle wheel assembly 15 illustrated in FIG. 23, the hydraulic cylinder 63 is extended. FIG. 25 illustrates the linkage mechanism 27a in the same position shown in FIG. 23, but with more detail of the rear of the trailer chassis 12 shown. Referring to both FIGS. 23 and 25, a hydraulic control system (not shown) maintains the cylinder 63 in its extended position, which holds the trailer 11 in its transport position. In this regard, just as the links C and D of the linkage mechanism 27 communicates a significant amount of the weight of the trailer chassis 12 and any load it carries (e.g., the excavator 19) to the axle wheel assembly 15, the hydraulic cylinder 63 in its extended position of FIG. 23 communicates approximately the same amount of the weight to the axle wheel assembly 15. The hydraulic cylinder 63 is capable of supporting the weight. However, any fluid leakage in the hydraulic cylinder 63 or its supporting hydraulic system can result in the hydraulic cylinder 63 uncontrollably retracting under the weight of the trailer 11 and its load. The linkage mechanism 27 of FIGS. 1-22 locks the trailer 11 in place in the transport position and, therefore, does not share this disadvantage if there is a leak in this hydraulic cylinder 49 or its control system.

In addition to supporting the axle wheel assembly 15 in its transport position, the hydraulic cylinder 63 also raises and lowers the axle wheel assembly 15. FIG. 24 illustrates the hydraulic cylinder 63 in its retracted position, which rotates the linkage mechanism 27a about the pivot axes joining linkage mechanism 27a to the axle carrier frame 16 and the hinge assembly 43. In FIG. 24, the rotation of the links A and B is counterclockwise as the hydraulic cylinder 63 retracts its piston. The counterclockwise rotation of the links A and B raises the axle wheel assembly 15, which lowers the rear of the trailer chassis 12 as explained previously in connection with FIGS. 1A though 1O.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The use of examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Variations of the embodiments of the invention described herein may become apparent upon reading the foregoing description. The inventor expect artisans skilled in the art of designing trailers of the type described herein will employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A trailer with a pair of wheel assemblies pivotally mounted to a chassis of the trailer for movement between transport and loading positions such that wheels of the wheel assemblies are aligned across a back of the chassis and contact a ground surface when the wheel assemblies are in the transport position and are free of contact with the ground surface when the wheel assemblies are in the loading position,
    each of the wheel assemblies secured to the chassis by a linkage mechanism for moving the wheel assembly in both vertical and horizontal directions so as to move the wheel assembly between the transport and loading positions, and
    a fastener associated with each of the wheel assemblies, wherein each of the fasteners includes both chassis and wheel assembly components that are automatically engaged with each other when the linkage mechanism moves the wheel assembly to its transport position.

2. The trailer of claim 1 wherein the chassis and wheel assembly components of each fastener include an extension of the chassis of the trailer and a part of the linkage mechanism that engage with each other when the wheel assembly is in the transport position.

3. The trailer of claim 2 wherein the part of the linkage mechanism that engages with the extension of the chassis is a link of the linkage mechanism.

4. The trailer of claim 3 wherein the link includes a tab and the extension forms a pocket for receiving the tab when the wheel assembly is in the transport position.

5. The trailer of claim 1 wherein each of the wheel assemblies includes an axle for supporting the wheels with at least one wheel on each side of a pivot securing the axle to a carrier frame of the wheel assembly.

6. The trailer of claim 1 wherein the chassis and wheel assembly components of each fastener include a receptacle extending from the chassis for receiving a tab extending from a link of the linkage mechanism such that the tab is lowered into the receptacle when the wheel assembly is moved to the transport position.

7. The trailer of claim 1 wherein the linkage mechanism of each wheel assembly includes hydraulic cylinders for first lifting the wheel assembly and then moving the wheel assembly laterally to a position that clears a rear of the chassis, allowing access to a deck of the chassis so that a load is able to be moved onto the trailer.

8. The trailer of claim 7 wherein the deck of the chassis is inclined.

9. The trailer of claim 8 including a ramp extending from the rear of the chassis to the ground surface when the wheel assemblies are in the loading position such that an incline of the ramp approximates the incline of the deck.

10. The trailer of claim 1 wherein the linkage mechanism includes links secured to each other and a hydraulic cylinder such that movement of a rod of the hydraulic cylinder transitions the links between a position that aligns the links and an unaligned position.

11. The trailer of claim 10 wherein one end of the hydraulic cylinder is secured to the a hinge assembly and another end is secured to the links of the linkage mechanism such that when the hydraulic cylinder aligns the links the wheel assembly is in the transport position.

12. The trailer of claim 1 wherein each of the wheel assemblies includes an axle having first and second ends, wherein the axle is secured between the first and second ends to a pivot such that one or more pairs of wheels are mounted to the axle on each side of the pivot.

13. The trailer of claim 12 wherein each of the wheel assemblies includes a carrier frame connecting the pivot and one end of the linkage mechanism.

14. The trailer of claim 13 wherein another end of the linkage mechanism is connected to a hinge assembly mounted to the chassis, which enables the wheel assembly to rotate outwardly and inwardly between the loading position and a position intermediate the loading and transport positions.

15. The trailer of claim 12 wherein the one or more pairs of wheels mounted to the axle on each side of the pivot include tires.

16. A trailer with a pair of wheel assemblies pivotally mounted to a chassis of the trailer for movement between transport and loading positions such that wheels of the wheel assemblies are aligned across a back of the chassis and contact a ground surface when the wheel assemblies are in the transport position and are free of contact with the ground surface when the wheel assemblies are in the loading position, each of the wheel assemblies secured to the chassis by a linkage mechanism for moving the wheel assembly in both vertical and horizontal directions so as to move the wheel assembly between the transport and loading positions, each of the linkage mechanisms including a prime mover for driving movement of one or more links of the linkage mechanism in order to move the associated wheel assembly in at least the vertical direction such that when the wheel assembly is in the transport position, substantially none of the weight of the chassis is supported by the prime mover, and wherein actuation of the prime mover moves the wheel assembly away from the transport position by collapsing a load-bearing arrangement defined by at least two links aligned in a substantially straight line, the two aligned links having sufficient structural integrity to support a substantial amount of the weight of the chassis and any load the chassis carries.

17. The trailer of claim 16 wherein the prime mover is a first prime mover and a second prime mover moves each of the wheel assemblies in the horizontal direction to the loading position that is outboard of a rear of the chassis.

18. The trailer of claim 17 wherein the first and second prime movers are hydraulic cylinders.

19. The trailer of claim 16 including a fastener for locking each of the wheel assemblies in the transport position such that the movement of the wheel assembly in the vertical direction by the linkage mechanism and the prime mover automatically unlocks the wheel assembly from the transport position.

20. The trailer of claim 16 wherein the prime mover is a hydraulic cylinder with one end secured to the one or more links of the linkage mechanism.

21. The trailer of claim 16 wherein the prime mover is a hydraulic cylinder connected at one end to a hinge assembly and connected at a second end to joined ends of the two aligned links such that actuation of the hydraulic cylinder moves the two aligned links between at least two positions, wherein one position maintains the two aligned links in alignment so that the two aligned links at least partially define the load-bearing arrangement, and another position which displaces the two aligned links out of alignment to collapse the load-bearing arrangement and move the wheel assembly away from the transport position.

22. A trailer with a pair of wheel assemblies pivotally mounted to a chassis of the trailer for movement between transport and loading positions such that wheels of the wheel assemblies are aligned across a back of the chassis and contact a ground surface when the wheel assemblies are in the transport position and are free of contact with the ground surface when the wheel assemblies are in the loading position, each of the wheel assemblies secured to the chassis by a mechanism for moving the wheel assembly in both vertical and horizontal directions so as to move the wheel assembly between the transport and loading positions, and a fastener for automatically locking each of the wheel assemblies to the chassis when the wheel assembly is moved by the mechanism into the transport position.

23. The trailer of claim 22 wherein each of the fasteners includes an extension of the chassis of the trailer for mating to a part of the mechanism.

24. The trailer of claim 23 wherein the mechanism is a linkage mechanism.

25. The trailer of claim 22 wherein the mechanism is a linkage mechanism including a prime mover for driving movement of one or more links of the linkage mechanism in order to move the associated wheel assembly in at least the vertical direction such that when the wheel assembly is in the transport position, substantially none of the weight of the chassis is supported by the prime mover, and wherein actuation of the prime mover moves the wheel assembly away from the transport position by collapsing a load-bearing arrangement defined by at least two links aligned in a substantially straight line, the two aligned links having sufficient structural integrity to support a substantial amount of the weight of the chassis and any load the chassis carries.

* * * * *